United States Patent
Lu et al.

(10) Patent No.: US 10,989,885 B2
(45) Date of Patent: Apr. 27, 2021

(54) SEMICONDUCTOR PACKAGE STRUCTURE AND METHOD FOR MANUFACTURING THE SAME

(71) Applicant: Advanced Semiconductor Engineering, Inc., Kaohsiung (TW)

(72) Inventors: Mei-Ju Lu, Kaohsiung (TW); Chi-Han Chen, Kaohsiung (TW); Zong-Yu Yang, Kaohsiung (TW); Pei-Jung Yang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 16/413,487

(22) Filed: May 15, 2019

(65) Prior Publication Data
US 2020/0363594 A1    Nov. 19, 2020

(51) Int. Cl.
*G02B 6/42*    (2006.01)

(52) U.S. Cl.
CPC ......... *G02B 6/4206* (2013.01); *G02B 6/4228* (2013.01)

(58) Field of Classification Search
CPC ... G02B 6/4206; G02B 6/4214; G02B 6/4228
USPC .................................................. 385/33, 36
See application file for complete search history.

(56) References Cited

U.S. PATENT DOCUMENTS

| | | | |
|---|---|---|---|
| 7,362,926 B2 * | 4/2008 | Umezawa | G02B 6/4204 385/14 |
| 9,179,541 B1 * | 11/2015 | Doyle | G02B 6/4295 |
| 9,671,574 B2 * | 6/2017 | Lee | G02B 6/43 |
| 10,025,044 B1 * | 7/2018 | Masuda | G02B 6/4214 |
| 10,168,495 B1 * | 1/2019 | Sagara | G02B 6/036 |
| 10,180,547 B2 * | 1/2019 | Lee | G02B 6/4246 |
| 10,215,919 B2 * | 2/2019 | Collins | G02B 6/305 |
| 2004/0131302 A1 * | 7/2004 | Kouta | G01J 1/4228 385/14 |
| 2004/0264884 A1 * | 12/2004 | Liu | G02B 6/4249 385/89 |
| 2006/0023990 A1 * | 2/2006 | Shih | G02B 6/4214 385/14 |
| 2011/0299808 A1 * | 12/2011 | Matsuoka | G02B 6/43 385/14 |
| 2013/0163918 A1 * | 6/2013 | Won | G02B 6/262 385/14 |
| 2014/0029894 A1 * | 1/2014 | Bowen | G02B 6/4214 385/37 |
| 2014/0294339 A1 * | 10/2014 | Lagziel | G02B 6/2804 385/14 |
| 2018/0149815 A1 * | 5/2018 | Heroux | G02B 6/34 |

(Continued)

FOREIGN PATENT DOCUMENTS

WO    WO2017/151416 A2    9/2017

*Primary Examiner* — Robert Tavlykaev
(74) *Attorney, Agent, or Firm* — Foley & Lardner LLP

(57) ABSTRACT

A semiconductor module includes a photonic integrated circuit and a receptacle. The photonic integrated circuit includes a substrate, a waveguide disposed on the substrate, and a recess in the substrate and having a first width. The receptacle is bonded to a top surface of the substrate and aligning with the recess. The receptacle and the recess jointly form a cavity, and the receptacle has a second width greater than the first width. A method for manufacturing the semiconductor module is also disclosed.

20 Claims, 26 Drawing Sheets

(56) References Cited

U.S. PATENT DOCUMENTS

| | | | | |
|---|---|---|---|---|
| 2018/0329159 A1* | 11/2018 | Mathai | ............... | G02B 6/4259 |
| 2019/0113695 A1* | 4/2019 | Heroux | ............... | G02B 6/4206 |
| 2019/0324207 A1* | 10/2019 | Choraku | ............... | G02B 6/122 |
| 2020/0027798 A1* | 1/2020 | Lin | ............... | H01L 22/14 |

* cited by examiner

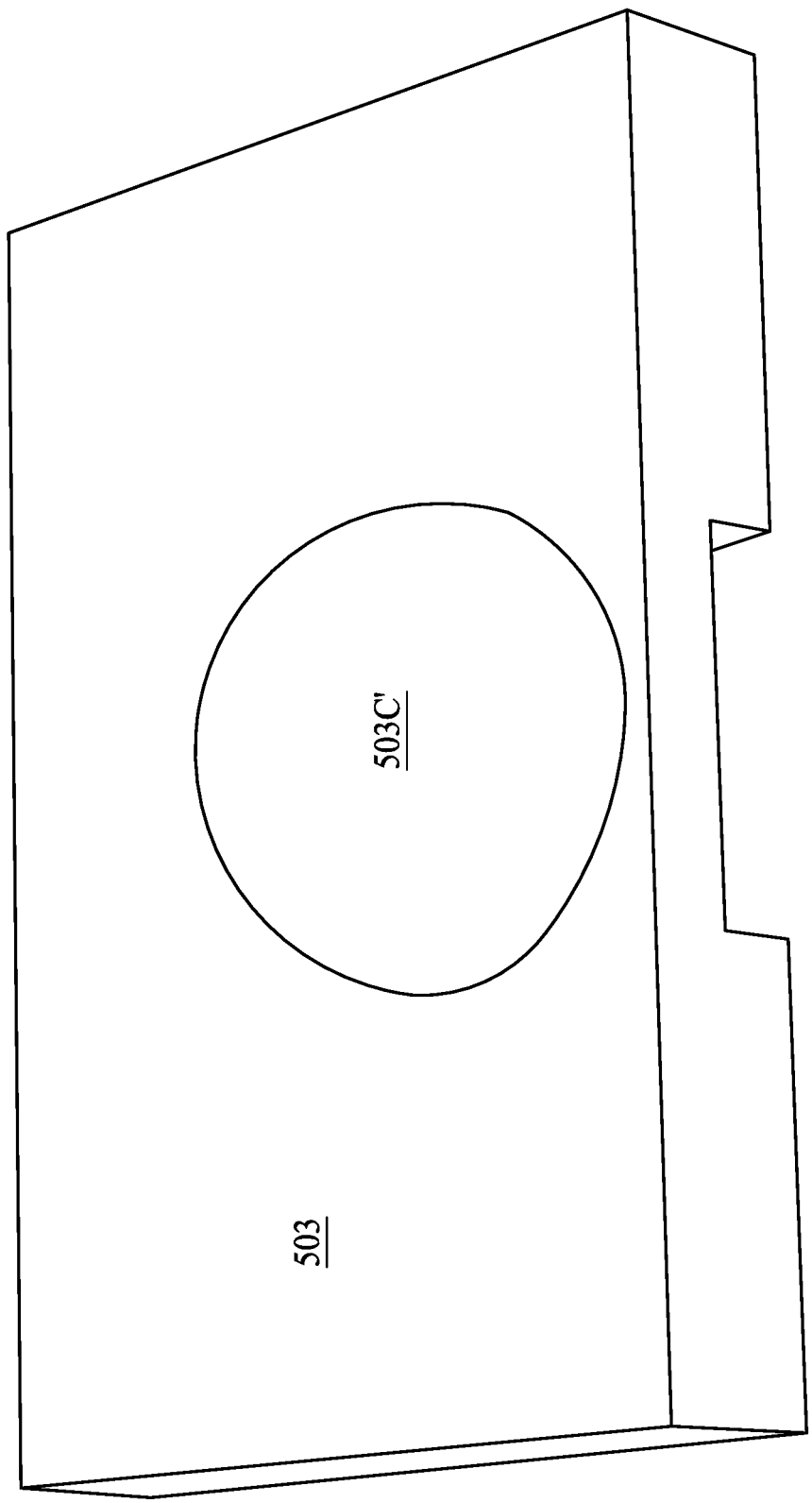

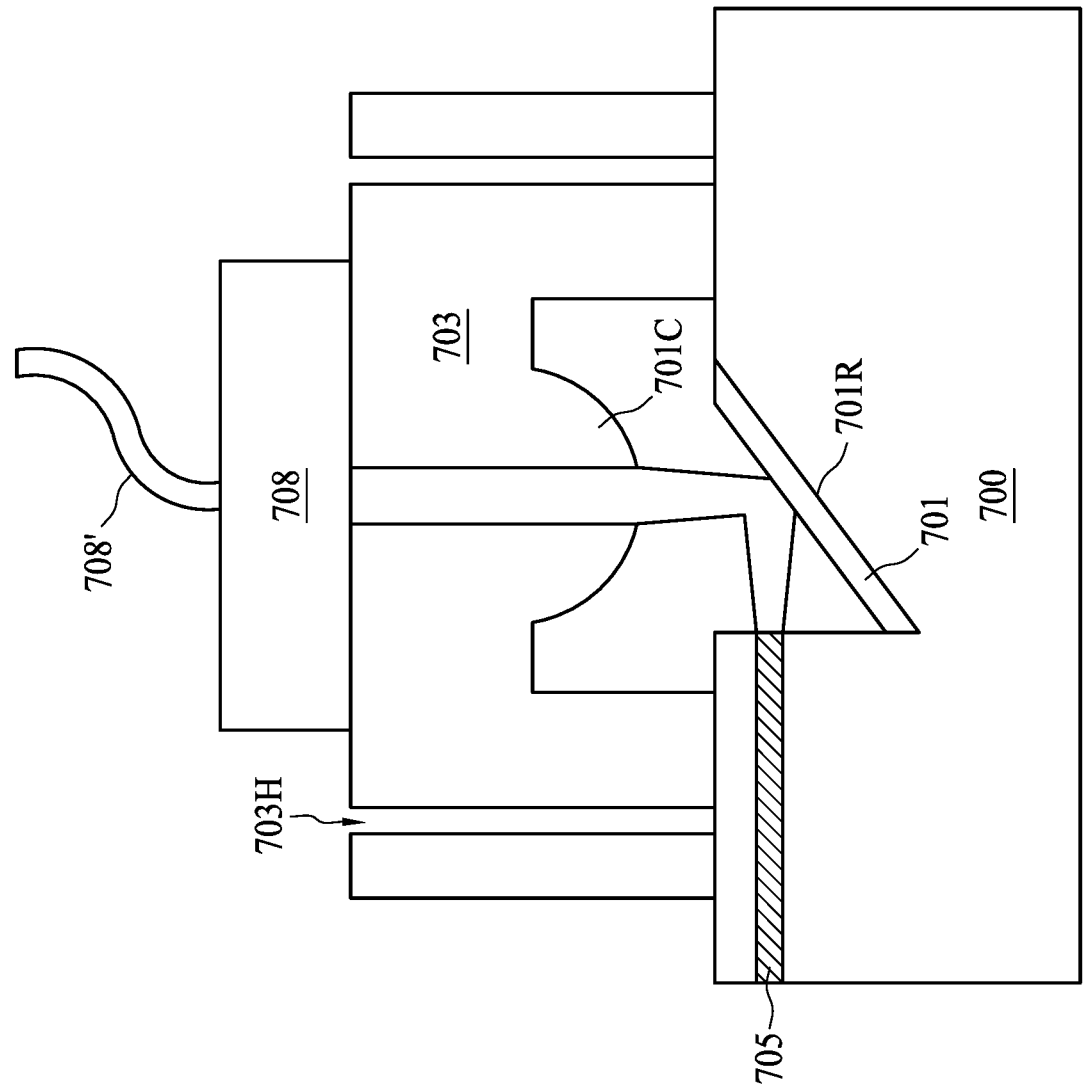

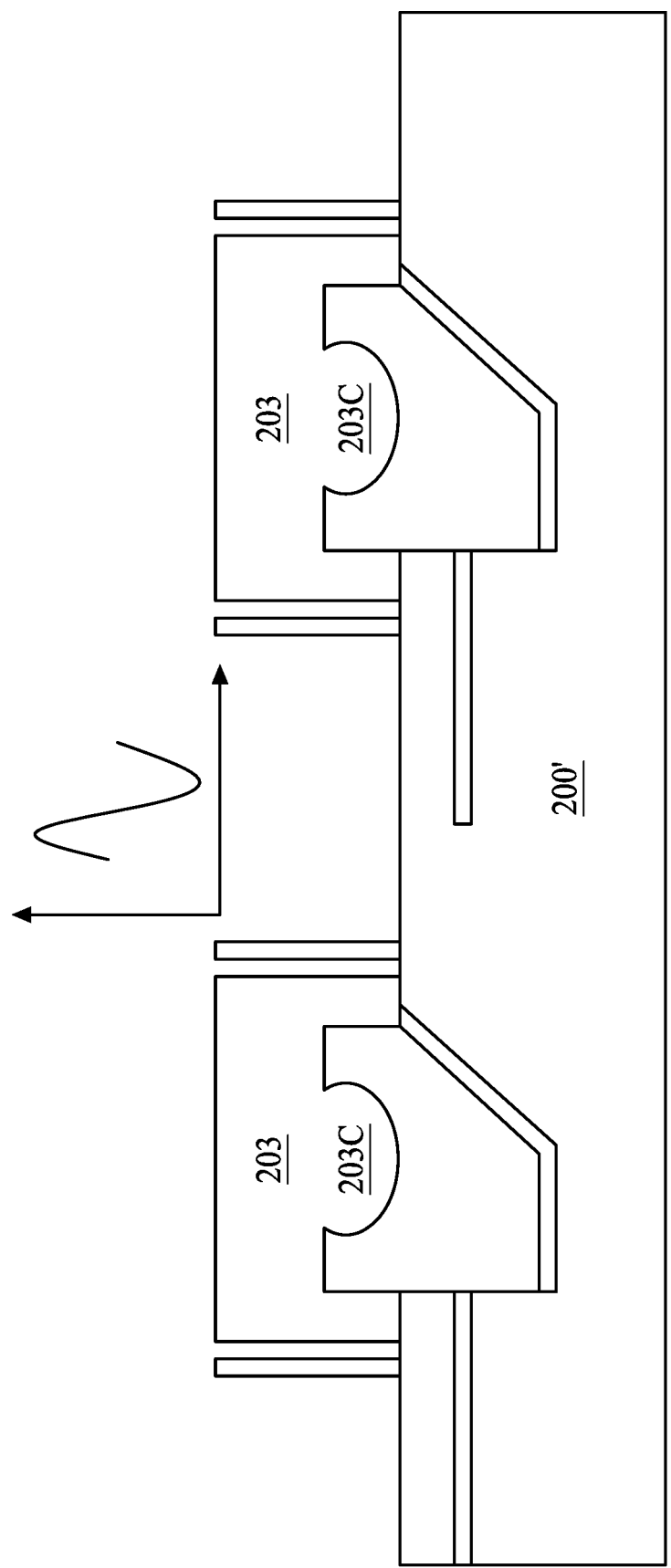

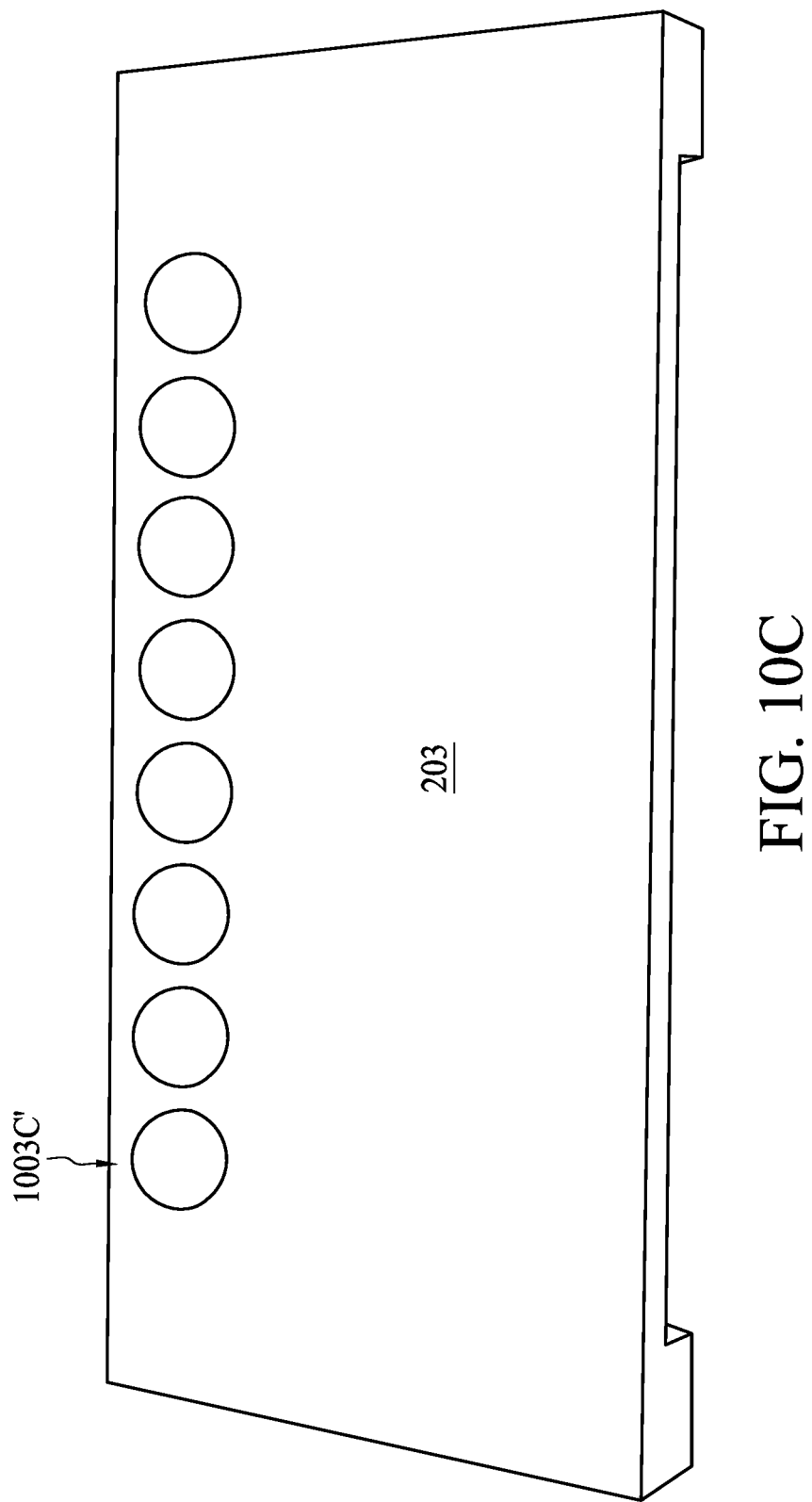

SEMICONDUCTOR PACKAGE STRUCTURE AND METHOD FOR MANUFACTURING THE SAME

BACKGROUND

1. Technical Field

The present disclosure relates to a semiconductor package structure having an optical interconnection.

2. Description of the Related Art

Optical communication product, including but not limited to optical transceiver or optical engine, is developed from silicon photonic technology. One of the challenges is to couple optical signal from the waveguide of a silicon photonic chip to an optical fiber. Due to the size mismatch between the waveguide (e.g., silicon waveguide, 220 nm*450 nm) on the chip and the optical fiber (e.g., single mode fiber, diameter 9 micron), optical loss often occur and resulting in signal attenuation. Therefore, improving coupling of optical signal from a waveguide to a fiber and at the same time raising production throughput and being cost effective are of primary importance.

SUMMARY

In some embodiments, the present disclosure provides a wafer-level semiconductor package structure, including a semiconductor wafer having a plurality of chip areas. One of the chip areas including a recess in the semiconductor wafer and having a first width, a receptacle bonded to a top surface of the semiconductor wafer and aligning with the recess. The receptacle and the recess jointly form a cavity, and the receptacle has a second width. The second width is greater than the first width.

In some embodiments, the present disclosure provides a semiconductor module, including a photonic integrated circuit and a receptacle. The photonic integrated circuit includes a substrate, a waveguide disposed on the substrate, and a recess in the substrate and having a first width. The receptacle is bonded to a top surface of the substrate and aligning with the recess. The receptacle and the recess jointly form a cavity, and the receptacle has a second width greater than the first width.

In some embodiments, the present disclosure provides a method for manufacturing a semiconductor module. The method includes (1) providing a semiconductor wafer having a plurality of chip areas, one of the chip areas having a waveguide; (2) forming a recess in the semiconductor wafer, and (3) bonding a receptacle to the semiconductor wafer and overlying the recess. The receptacle and the recess jointly form a cavity, and the waveguide is exposed to the cavity

BRIEF DESCRIPTION OF THE DRAWINGS

Aspects of the present disclosure are readily understood from the following detailed description when read with the accompanying figures. It should be noted that various features may not be drawn to scale. In fact, the dimensions of the various features may be arbitrarily increased or reduced for clarity of discussion.

FIG. 5A, FIG. 5B, FIG. 5C, and FIG. 5D illustrate various perspective views of a receptacle according to some embodiments of the present disclosure.

FIG. 7A, FIG. 7B, FIG. 7C, and FIG. 7D illustrate cross sectional views of a receptacle, a ferrule, and the underlying chip area according to some embodiments of the present disclosure.

FIG. 8A, FIG. 8B, FIG. 8C, FIG. 8D, FIG. 8E, FIG. 8F, FIG. 8G illustrate cross sectional views of a semiconductor module during various manufacturing operations according to some embodiments of the present disclosure.

FIG. 10B, FIG. 10C, and FIG. 10D illustrate various perspective views of a receptacle with a micro lens array according to some embodiments of the present disclosure.

DETAILED DESCRIPTION

Figure 1:
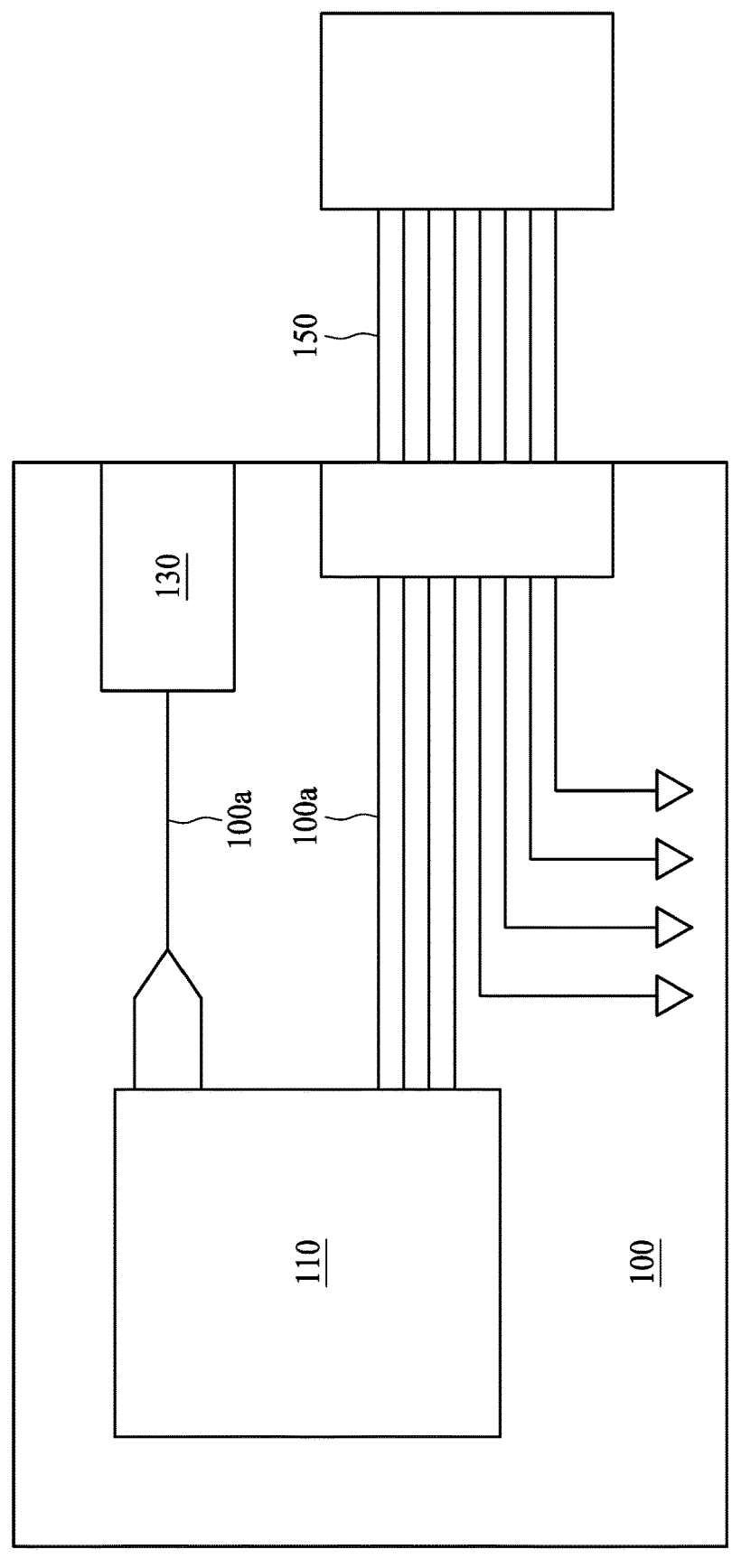
FIG. 1 illustrates a top view of a semiconductor module according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

Spatial descriptions, such as "above," "below," "up," "left," "right," "down," "top," "bottom," "vertical," "horizontal," "side," "higher," "lower," "upper," "over," "under," and so forth, are specified with respect to a certain component or group of components, or a certain plane of a component or group of components, for the orientation of the component(s) as shown in the associated figure. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

For photonic IC with waveguide edge coupling setting, coupling between the waveguide and the optical fiber can be done at die level packaging, that is, after separating each photonic IC from a fabricated wafer, optical fiber may then be aligned with the waveguide of each separated photonic IC from an edge of the separated photonic IC. Alternatively stated, integrating optical fiber to the waveguide at a wafer level is constrained by the nature of edge coupling. As a result, with this reason and among others, production throughput of photonic IC may be hindered.

During die level packaging, optical fiber and the waveguide in the photonic IC are aligned through an operation called active alignment so as to maximize coupling efficiency. Optical source has to be turned on during active alignment, and usually the fiber is moved while monitoring the coupling efficiency. Optimization of the efficiency is through the fine tuning of the fiber location and the monitoring of the optical signal. Active alignment is time-consuming and with high operation difficulties. With this reason and among others, production throughput of photonic IC may be hindered.

Present disclosure provides an optical connector including a ferrule and a receptacle. The ferrule is connected with optical fiber and the receptacle is connected with the photonic IC and prepared to couple the optical signal from waveguide to the ferrule. The receptacle may include a lens or lens array to collimate the optical beam from the waveguide and a reflector to alter the beam direction so that the optical beam would then enter the ferrule and the fiber. The receptacle can be bonded to the photonic IC at wafer level so as to improve the production throughput.

Referring to FIG. 1, FIG. 1 illustrates a top view of a semiconductor module 10 according to some embodiments of the present disclosure. The semiconductor module 10 can function as an optical transmitter and/or an optical receiver. In some embodiments, the semiconductor module 10 may include a first integrated circuit (IC) 100, which can be a photonic IC, being integrated with a second IC 110, which can be an electronic IC. In some embodiments, the photonic IC is greater in area than the electronic IC from a top view perspective. Electronic IC may include both active semiconductor devices and passive circuit components and the electrically conductive paths interconnecting the active semiconductor devices and passive circuit components in electrical circuit relationships for performing a desired sub-circuit control function. Photonic IC may include a combination of photonic devices in a circuit on a single substrate to achieve a desired function. For example, Photonic IC may include lasers 130, receivers, waveguides 100a, detectors, semiconductor optical amplifiers (SOA), gratings, and other active and passive semiconductor optical devices on a single substrate. The photonic IC 100 of the semiconductor module 10 can further connect to an external optical channel composed of optical fiber array 150. In some embodiments, the semiconductor module 10 can be a photonic engine.

Figure 2:
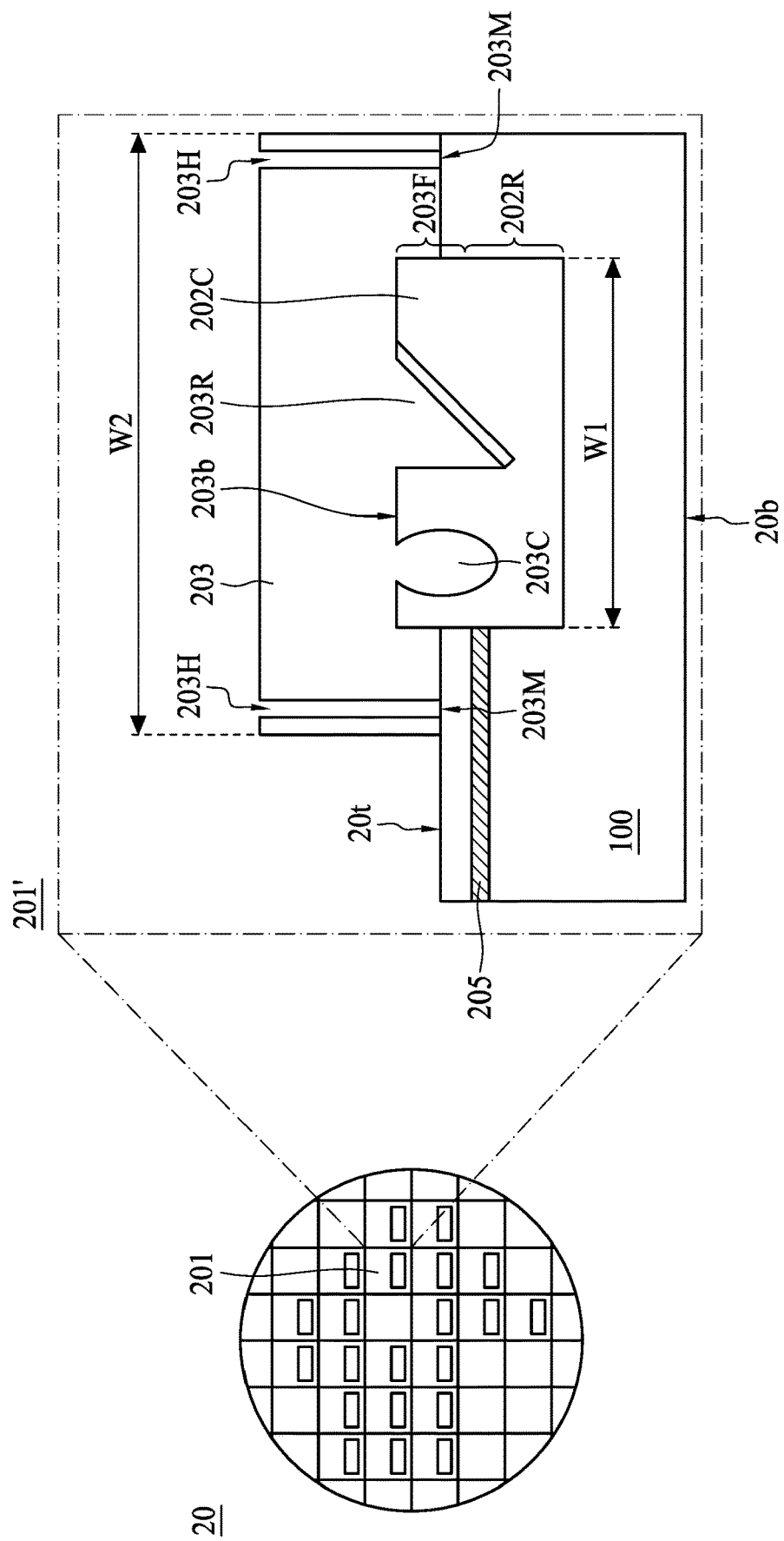
FIG. 2 illustrates a top view of a semiconductor wafer and an enlarged cross sectional view of chip area on the semiconductor wafer according to some embodiments of the present disclosure.

FIG. 2 illustrates a top view of a semiconductor wafer 20 and an enlarged cross sectional view 201' of a chip area 201 on the semiconductor wafer 20 according to some embodiments of the present disclosure. The semiconductor wafer 20 may include a diameter of 100 mm, 150 mm. 200 mm, 300 mm, 450 mm, and may be composed of semiconductor materials, including, but not limited to, silicon, germanium, silicon germanium, and III-V materials such as InP, GaAs, GaSb, or the like. The semiconductor wafer 20 may include a plurality of chip areas 201, each of which may include a first IC 100 as described in FIG. 1. Adjacent chip areas 201 on the semiconductor wafer 20 are separated by singulation regions such as die saw streets.

The enlarged cross sectional view 201' of one of the chip areas includes a semiconductor wafer 100 and a receptacle 203 bonded to a top surface 20t of the semiconductor wafer 100. The semiconductor wafer 100 has a recess 202R extending from the top surface 20t to a bottom surface 20b of the semiconductor wafer 100. A bottom of the recess 202R may be situated in the semiconductor wafer 100. As illustrated in FIG. 2, the recess 202R may possess a width W1 measured at the bottom of the recess 202R. The receptacle 203 may include a flange 203F in connection with the top surface 20t of the semiconductor wafer 100, and the receptacle 203 being aligning with the recess 202R. The receptacle 203 and the recess 202R jointly form a cavity 203 configured to alter a direction of an optical path. The cavity 203 includes the space of the recess 202R as well as the space created by the flange 203F of the receptacle 203. The receptacle 203 may possess a second width W2 measured at a top of the receptacle 203. Since the flange 203F is laid over the semiconductor wafer 100 enclosing the recess 202R, the second width W2 is greater than the first width W1.

In some embodiments, a through hole or a clear hole 203H on the receptacle 203 allows the alignment of the receptacle 203 to an alignment mark 203M on the top surface 20t of the semiconductor wafer 100, in order to better align the receptacle 203 on each of the chip areas during wafer-level operations.

Each of the chip areas 201 may possess a photonic IC, for example, a waveguide 205 is embedded in the semiconductor wafer 100 and exposing at the cavity 202C. In some embodiments, the receptacle 203 may include a collimator 203C disposed at a bottom surface 203b of the receptacle 203, configured to collimate the light beam from the waveguide 205 entering the cavity 202C. In some embodiments, the receptacle 203 further include a reflector 203R at the bottom surface 203b of the receptacle 203, configured to alter a direction of the path of the light beam from the waveguide 205 entering the cavity 202C. In some embodiments, the reflector 203R transforms the optical path from a horizontal direction to a vertical direction. Receptacle in the present disclosure is not limited to the configuration illustrated in the enlarged cross sectional view 201' of FIG. 2. Other embodiments of the receptacle, for example, showing in FIG. 5A to FIG. 5D, FIG. 7A to FIG. 7D, will be further discussed.

Figure 3:
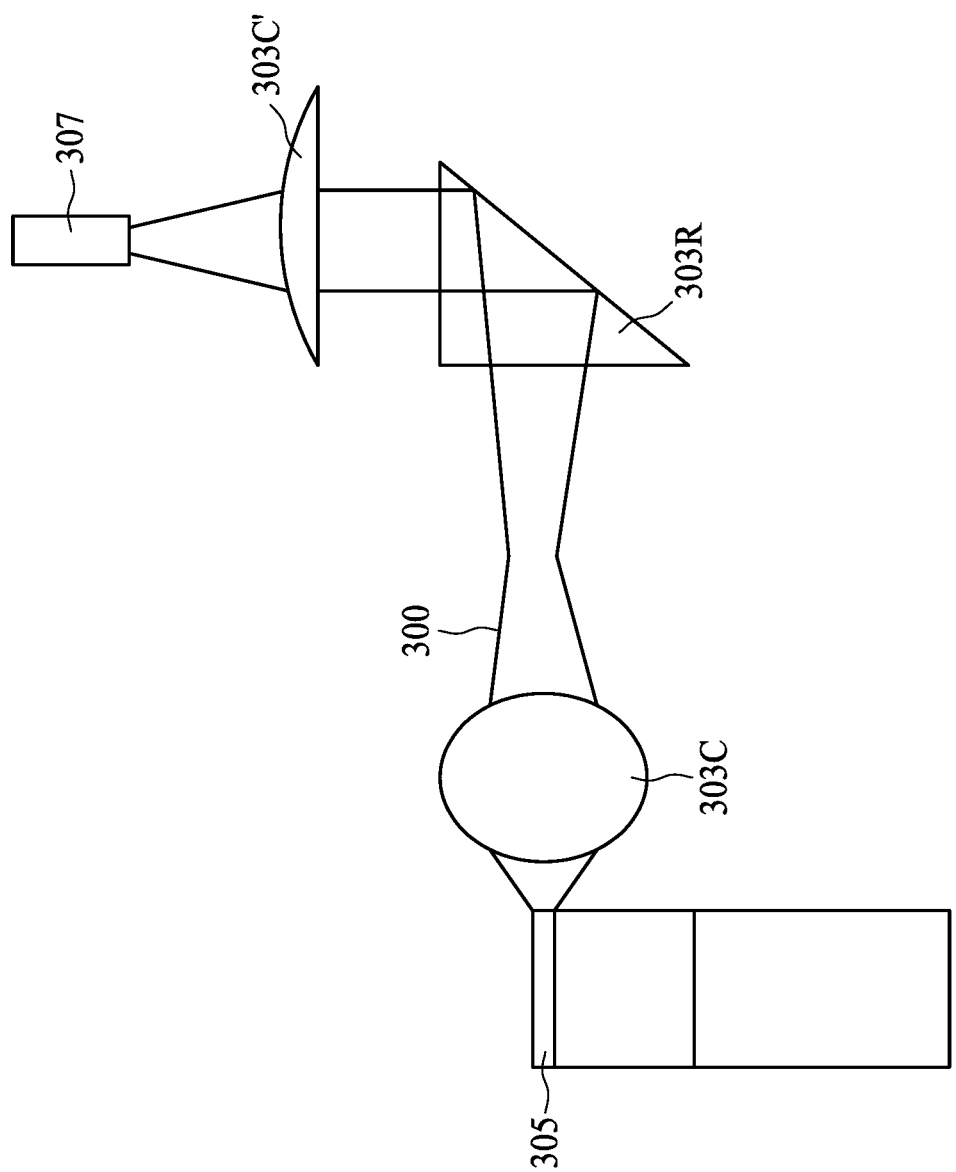
FIG. 3 illustrates an optical path with optical elements along the optical path according to some embodiments of the present disclosure.

FIG. 3 illustrates an optical path with optical elements along the optical path according to some embodiments of the present disclosure. Light beam 300 comes from a waveguide 305 may be captured by a collimator 303C before excessive beam spreading. The collimator 303C maintains a parallel beam which enters a reflector 303R that alter the direction of the light beam 300. The light beam 300 is then entered a second collimator 303C' and an optical fiber 307. In some embodiments, except for the optical fiber 307, other optical elements may or may not be integrated altogether on the receptacle 300, as will be described in FIG. 5A to FIG. 5D. In some embodiments, the first collimator 303C and/or the second collimator 303C' is selectively integrated on the receptacle 300, as will be described in FIG. 7A to FIG. 7D.

Figure 4:
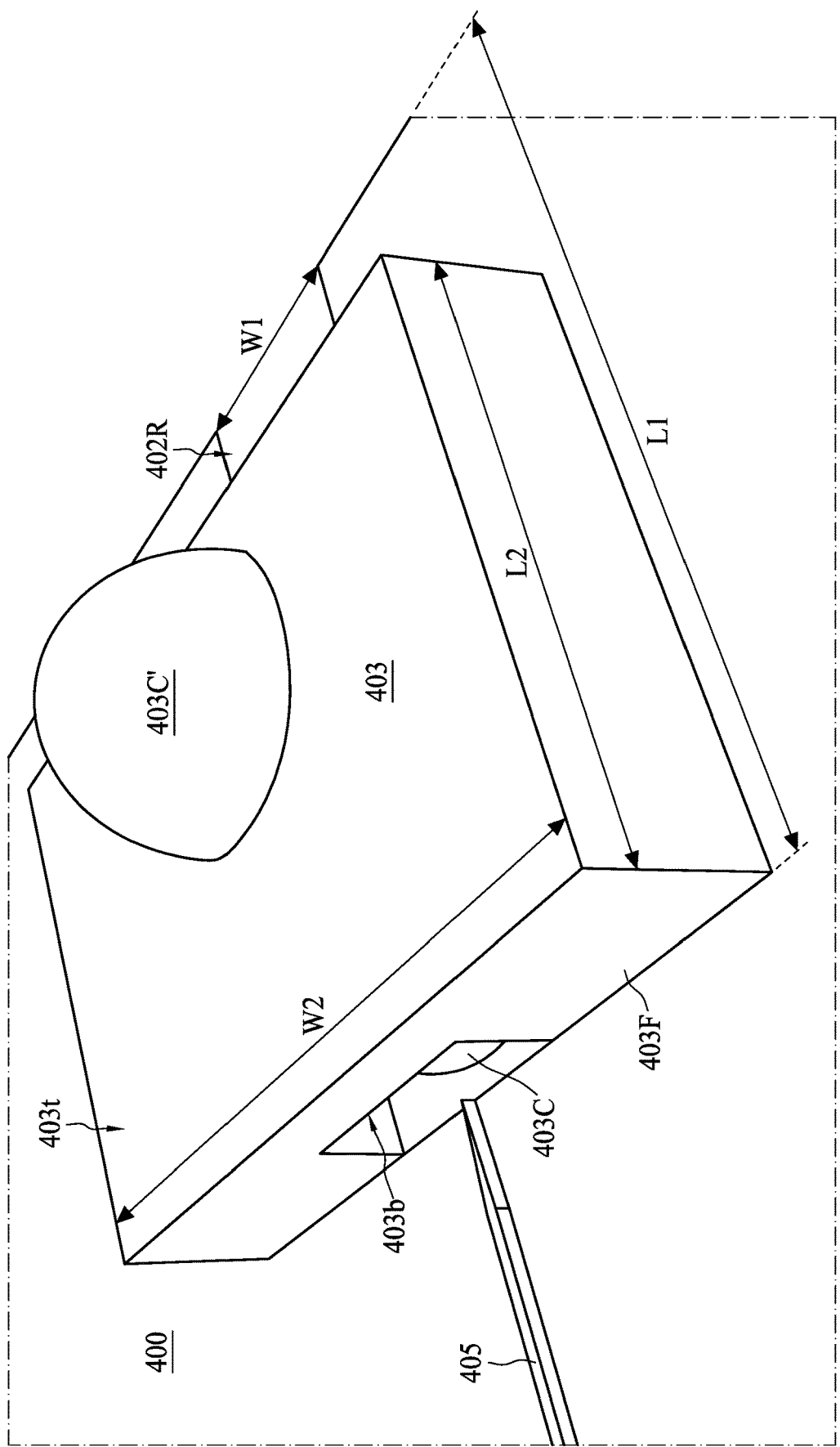
FIG. 4 illustrates a perspective view of a receptacle bonded to a semiconductor substrate according to some embodiments of the present disclosure.

Referring to FIG. 4, FIG. 4 illustrates a perspective view of a receptacle 403 bonded to a semiconductor substrate 400 according to some embodiments of the present disclosure. The semiconductor substrate 400 may be one of the chip areas diced out from a semiconductor wafer. As previously described, the flange 403F of the receptacle 403 is in contact, or bonded, with the semiconductor substrate 400, creating a cavity accommodating an optical element such as a first collimator 403C at a bottom surface 403b of the receptacle 403. As shown in FIG. 4, the first collimator 403C is disposed on an optical path of the light beam from the waveguide 405, or a tapered waveguide, entering into the cavity. The light beam is then reflected by a reflector (not shown) and enter the second collimator 403C' disposed at a top surface 403t of the receptacle 403. In some embodiments, the recess 402R of the semiconductor substrate 400 is exposed from a side due to dicing of the semiconductor wafer into individual chip areas. As previously discussed in FIG. 2, the first width W1 of the recess 402R is smaller than the second width W2 of the receptacle 403t. However, in a longitudinal direction of the recess 402R, a first length L1 of the recess 402R may be greater than a second length L2 of the receptacle 403.

Figure 5A:
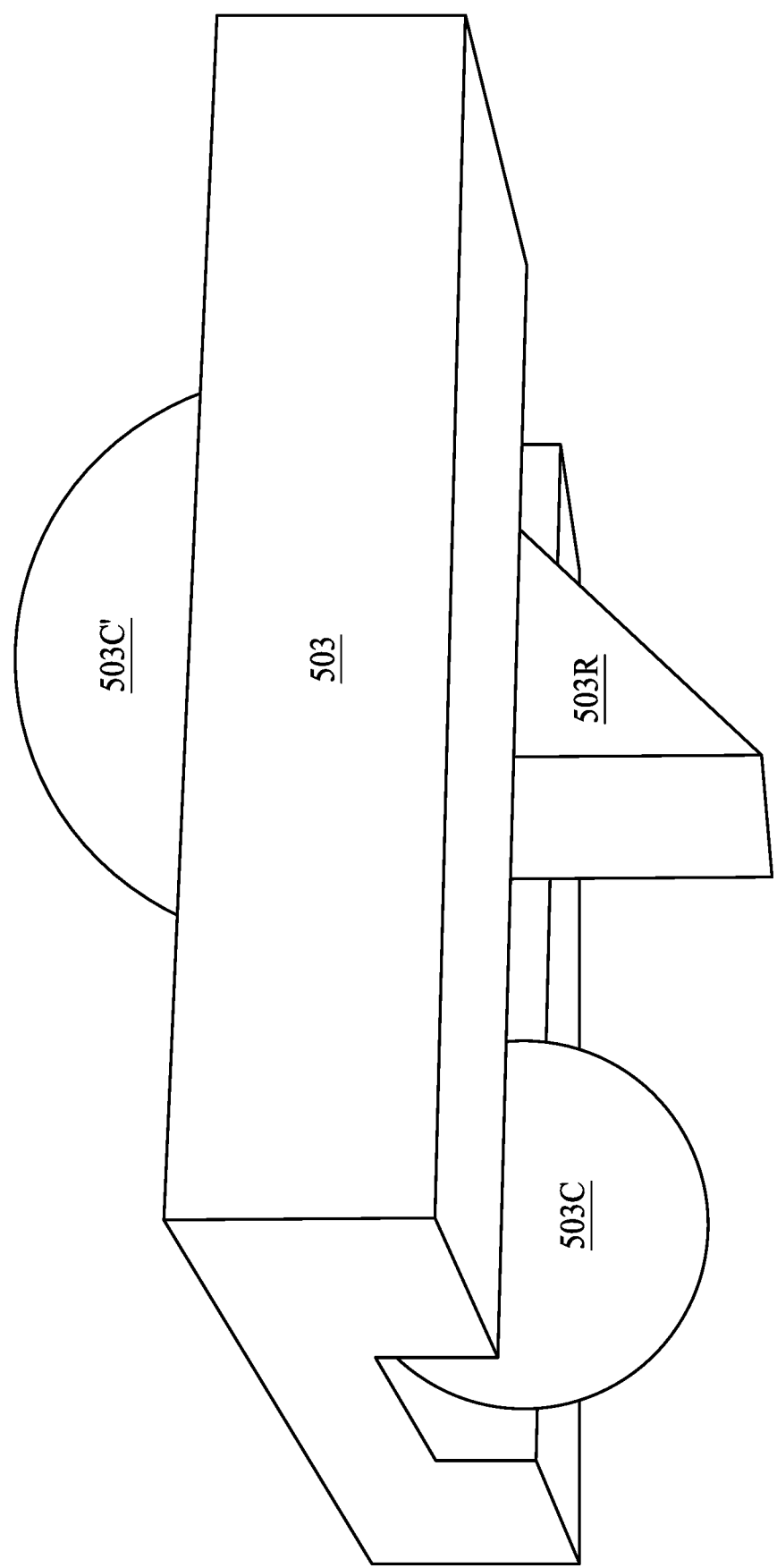
Figure 5B:
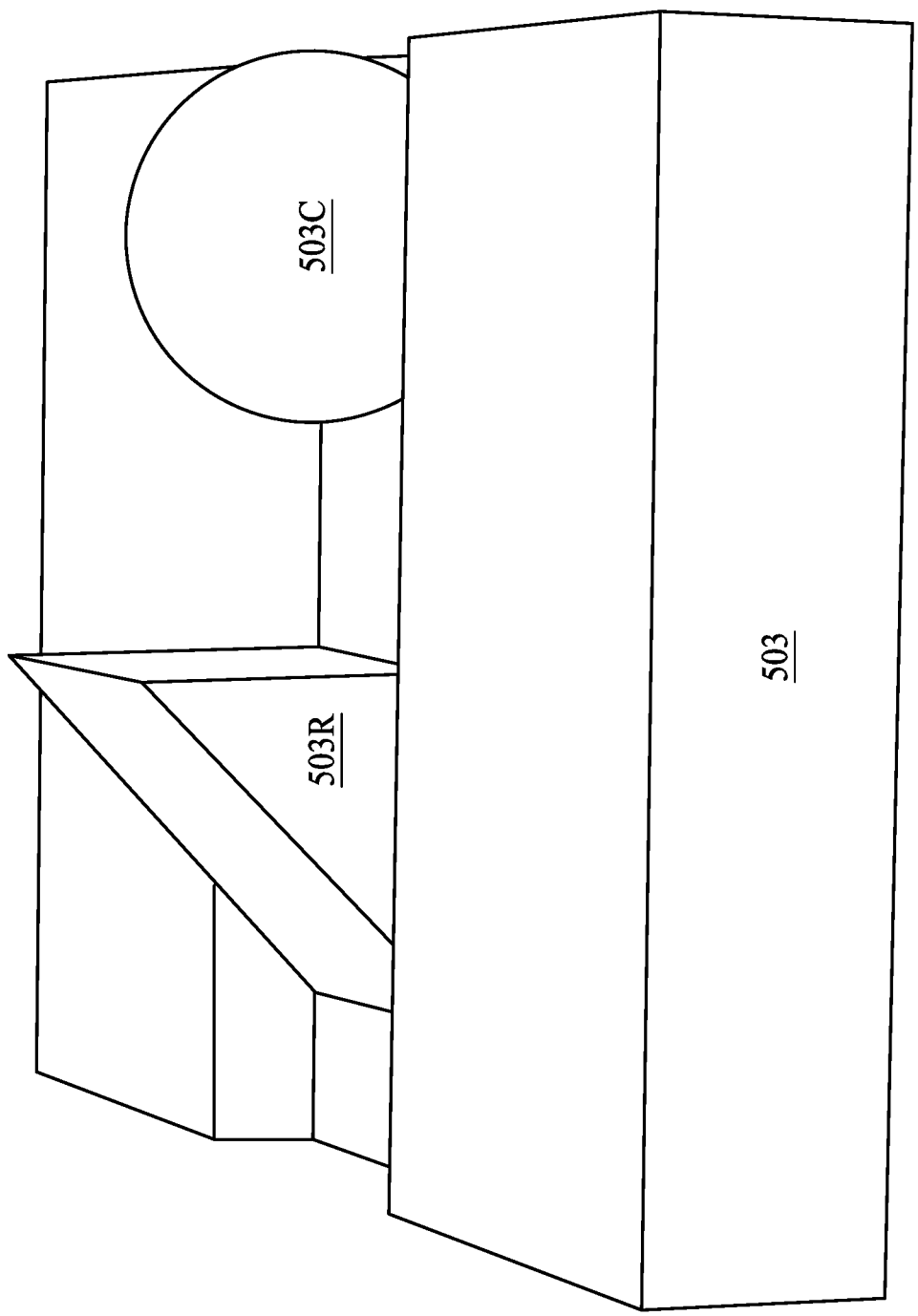
Figure 5D:
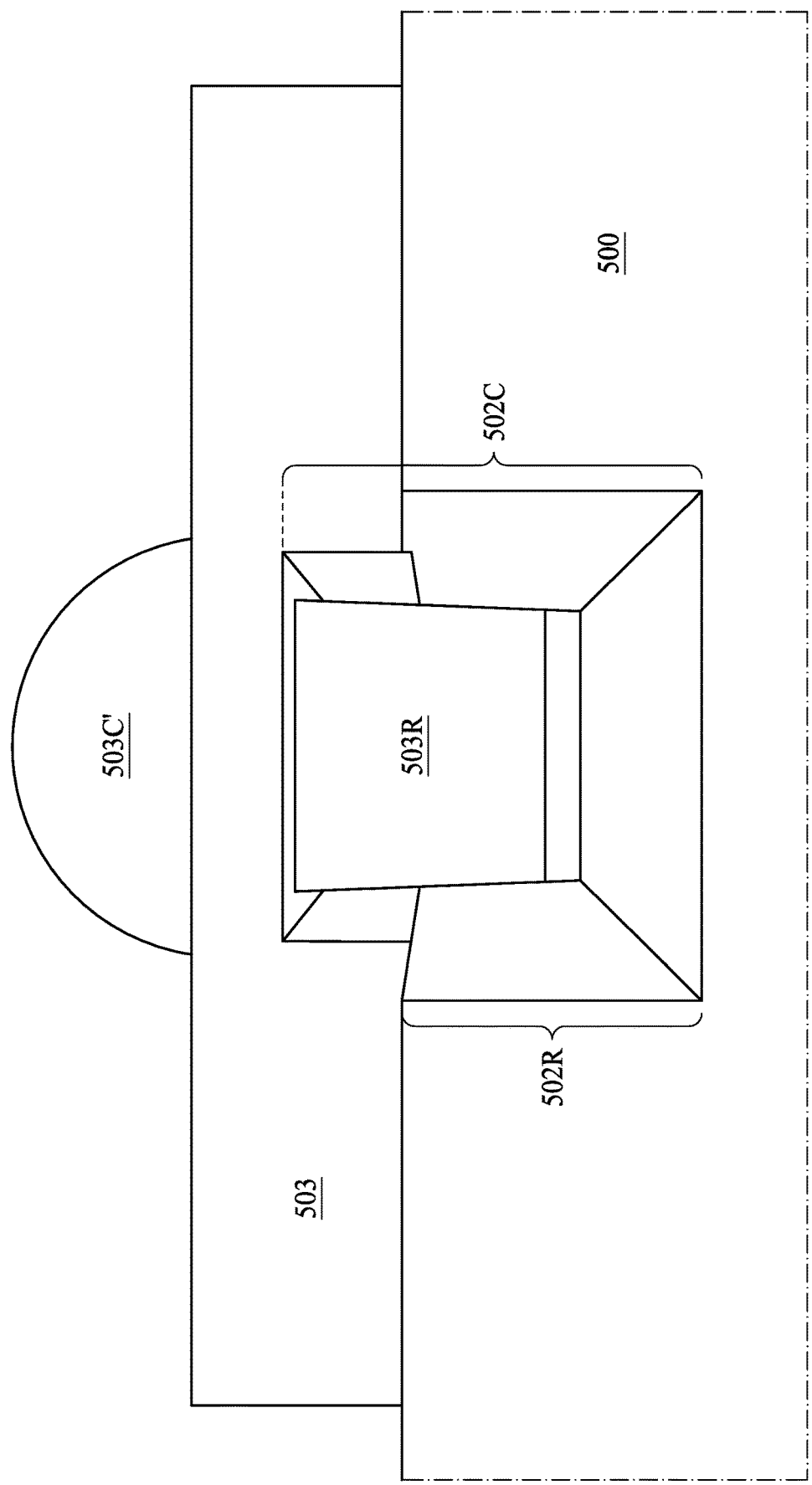

FIG. 5A, FIG. 5B, FIG. 5C, and FIG. 5D illustrate various perspective views of a receptacle according to some embodiments of the present disclosure. FIG. 5A is a receptacle 503 from a lower side perspective, showing the first collimator 503C and the reflector 503R at a bottom surface of the receptacle 503, and a second collimator 503C' at a top surface of the receptacle 503. In some embodiments, the reflector 503R and the second collimator 503C' can be in direct contact. In some embodiments, an air gap (not shown) may exist between the reflector 503R and the second collimator 503C'. In some embodiments, a space filled with index-matching oil may exist between the reflector 503R and the second collimator 503C'. FIG. 5B is a receptacle 503 from a bottom perspective, showing the first collimator 503C and the reflector 503R at a bottom surface of the receptacle 503. In some embodiments, the first collimator can be a ball lens or a micro lens array. In some embodiments, the reflector can be a prism or a prism array. FIG. 5C is a receptacle 503 from a top perspective, showing the second collimator 503C'. In some embodiments, the second collimator 503C' can be a ball lens or a micro lens array. FIG. 5D is a receptacle 503 from a side perspective, showing the recess 502R in the semiconductor substrate 500, the cavity 502C jointly formed by the receptacle 503 and the semiconductor substrate 500, the second collimator 503C', and the reflector 503R being accommodated in the cavity 502C. In some embodiments, a depth of the recess 502R may be determined according to the dimension of the optical elements such as the reflector and the collimator when the waveguide is positioned on a top surface of the semiconductor substrate 500. In some embodiments, the depth of the recess 502R as least has to laterally expose a waveguide embedded in the semiconductor substrate 500, so that the light beam may enter the cavity from the waveguide.

Figure 6:
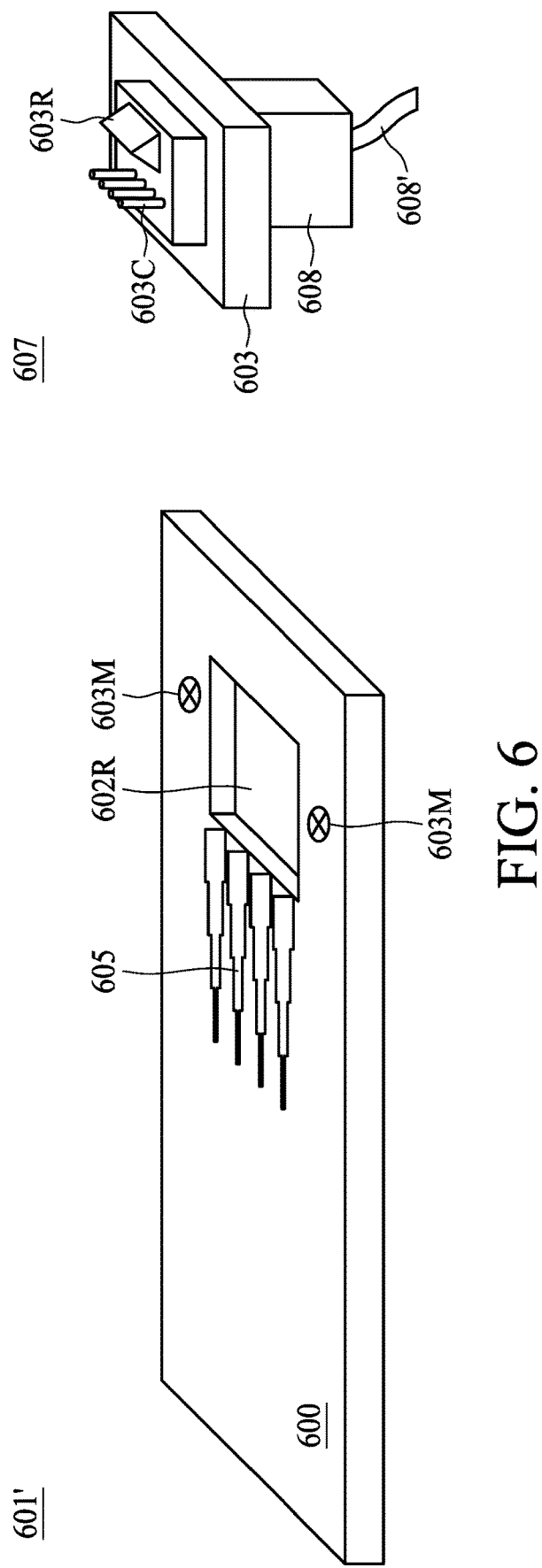
FIG. 6 illustrates a perspective view of a chip area and an optical interconnection according to some embodiments of the present disclosure.

Referring to FIG. 6, FIG. 6 illustrates a perspective view of a chip area 601' and an optical interconnection 607 according to some embodiments of the present disclosure. Note the optical interconnection 607 may include a receptacle 603 and pluggable element 608 carrying an optical fiber. The flange of the receptacle 603 is omitted to show the optical elements such as the collimator 603C and the reflector 603R. A clear hole can be machined on the receptacle 603 for the alignment of the receptacle 603 with the recess 602R through matching of the alignment mark 603M on the semiconductor substrate 600. The pluggable element 608 can be referred to as a ferrule in the present disclosure. The chip area 601' may include a waveguide array 605 on the surface of the semiconductor substrate 600. To pair with the waveguide array 605, the receptacle 603 may include a collimator 603 with a micro lens array. The reflector 603R on the receptacle can be a prism 603R. In some embodiments, the receptacle 603 is bonded to the semiconductor substrate 600 prior to connecting with the pluggable element 608. The optical interconnection 607 illustrated in FIG. 6 shows the pluggable element 608 being plugged into the receptacle 603 through a receivable means (not illustrated) on the receptacle 603. The receivable means is designed to receive the ferrule carrying optical fiber 608' by an easy plug-in operation.

FIG. 7A, FIG. 7B, FIG. 7C, and FIG. 7D illustrate cross sectional views of a receptacle 703, a ferrule 708, and the underlying chip area according to some embodiments of the present disclosure. Similar to FIG. 3, the optical path of the light beam coming out from the waveguide 705 passes a reflector and a collimator, and then entering an optical fiber.

In FIG. 7A, the light beam exits the waveguide 705 and enters the cavity jointly formed by the recess of the semiconductor substrate 700 and the receptacle 703. The light beam first encounters a slanted surface in the semiconductor substrate 700. The slanted surface can function as a reflector 701R, or a mirror, to alter the direction of the light beam from a horizontal direction to a vertical direction. As shown in FIG. 7A, reflective material 701' such as dielectric or metal can be coated on the slanted surface. In some embodiments, an angle of the slanted surface may be 45 degrees. The light beam being reflected then enters the collimator 701C, for example, a ball lens or a micro lens array, on the receptacle 703 and then entering the pluggable ferrule 708 carrying the optical fiber 708'. Although not illustrated in FIG. 7A, an additional ball lens or a micro lens array may be integrated in the ferrule 708 in order to collimate the light beam prior to its entering to the optical fiber 708'.

Figure 7B:
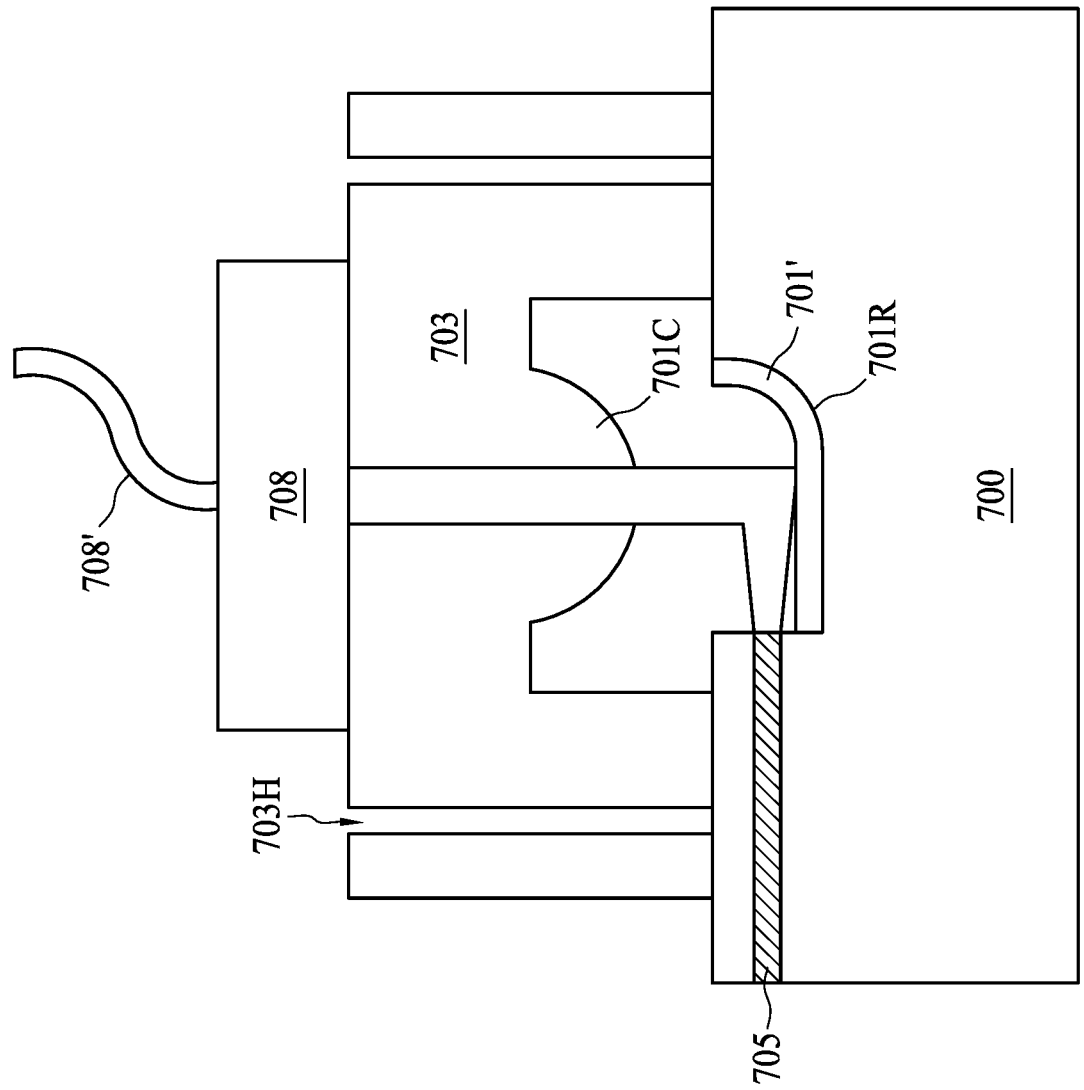

In FIG. 7B, the light beam exits the waveguide 705 and enters the cavity jointly formed by the recess of the semiconductor substrate 700 and the receptacle 703. The light beam first encounters a curved surface in the semiconductor substrate 700. The curved surface can function as a reflector 701R, or a mirror, to alter the direction of the light beam from a horizontal direction to a vertical direction. Compared to the slanted surface illustrated in FIG. 7A, the curved surface can also function as a focusing means that further reduce the width of the light beam before its entering to the collimator 701C. As shown in FIG. 7B, reflective material 701' such as dielectric or metal can be coated on the curved surface. The light beam being reflected then enters the collimator 701C, for example, a ball lens or a micro lens array, on the receptacle 703 and then entering the pluggable ferrule 708 carrying the optical fiber 708'. Although not illustrated in FIG. 7B, an additional ball lens or a micro lens array may be integrated in the ferrule 708 in order to collimate the light beam prior to its entering to the optical fiber 708'.

Figure 7C:
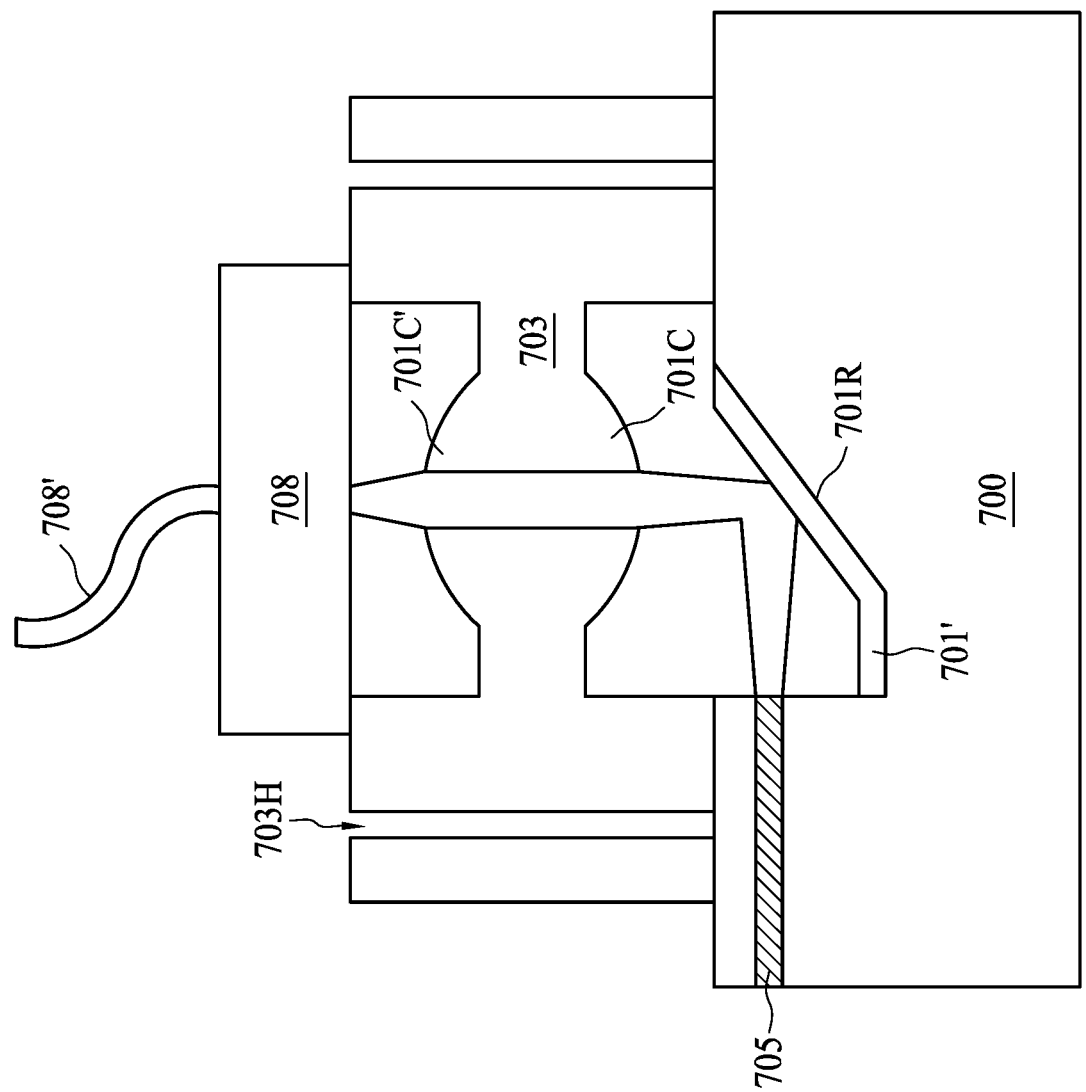

In FIG. 7C, the light beam exits the waveguide 705 and enters the cavity jointly formed by the recess of the semiconductor substrate 700 and the receptacle 703. The light beam first encounters a slanted surface in the semiconductor substrate 700. The slanted surface can function as a reflector 701R, or a mirror, to alter the direction of the light beam from a horizontal direction to a vertical direction. In addition to the slanted surface, a horizontal surface in connection with the slanted surface is machined in the semiconductor substrate 700. The design of the horizontal surface is to accommodate sufficient optical path length in order to expand the light beam to a desired level. As shown in FIG. 7C, reflective material 701' such as dielectric or metal can be coated on the slanted surface. In some embodiments, an angle of the slanted surface may be 45 degrees or 54.7 degrees. The light beam being reflected then enters the first collimator 701C, for example, a ball lens or a micro lens array, on the receptacle 703 and then entering a second collimator 701C' of the receptacle 703, for example, a ball lens or a micro lens array. Note the second collimator 701C' may not be aligned with the first collimator 701C. The light beam exiting from the second collimator 701C' may then enter the pluggable ferrule 708 carrying the optical fiber 708'. Although not illustrated in FIG. 7C, an additional ball lens or a micro lens array may be integrated in the ferrule 708 in order to collimate the light beam prior to its entering to the optical fiber 708'.

Figure 7D:
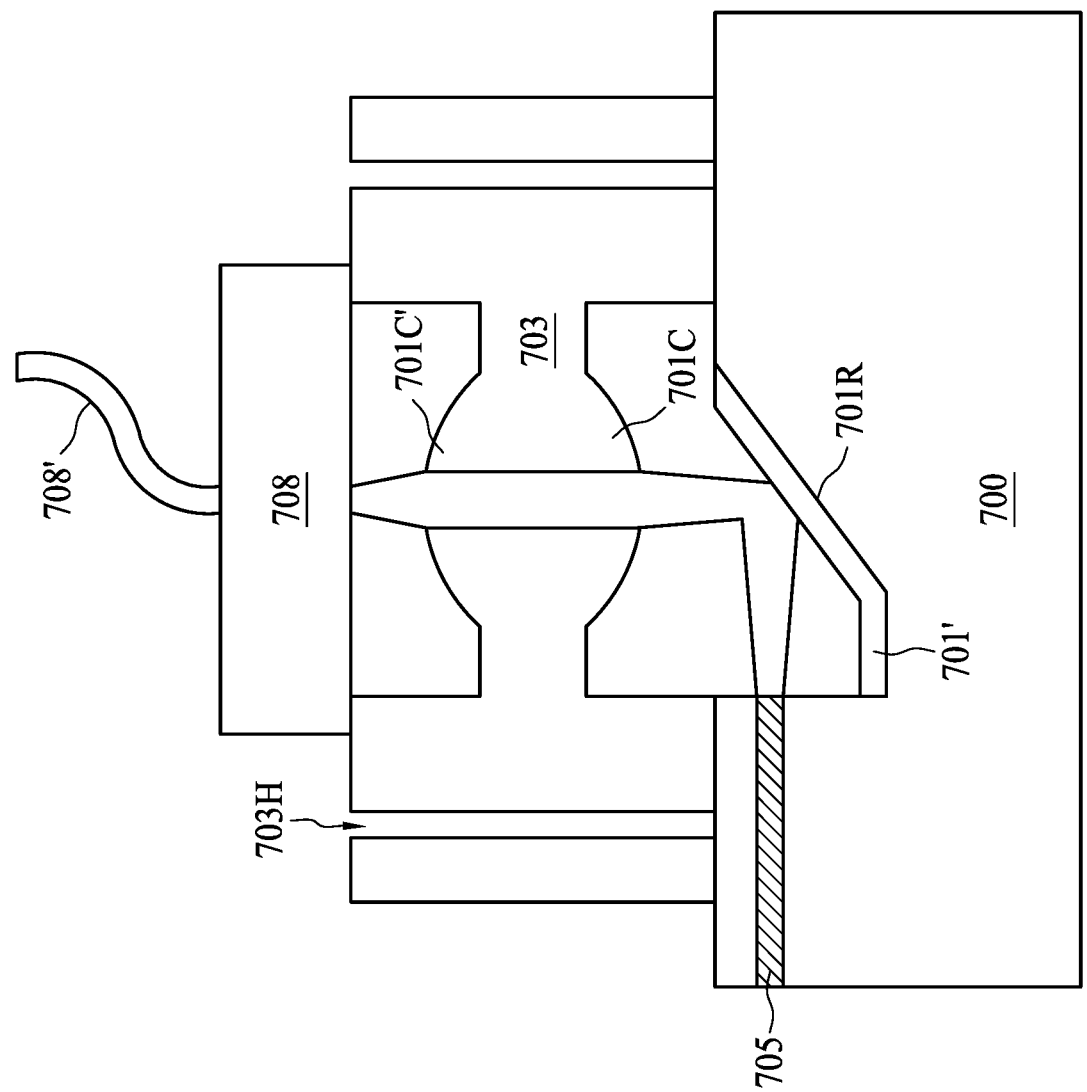

FIG. 7D is substantially identical to FIG. 7C except for that the second collimator 701C' may be aligned with the first collimator 701C. In FIG. 7A to FIG. 7D, a hole 703H can be machined on the receptacle 703 as an alignment means during the bonding of the receptacle 703 and the semiconductor substrate 700.

Figure 8A:
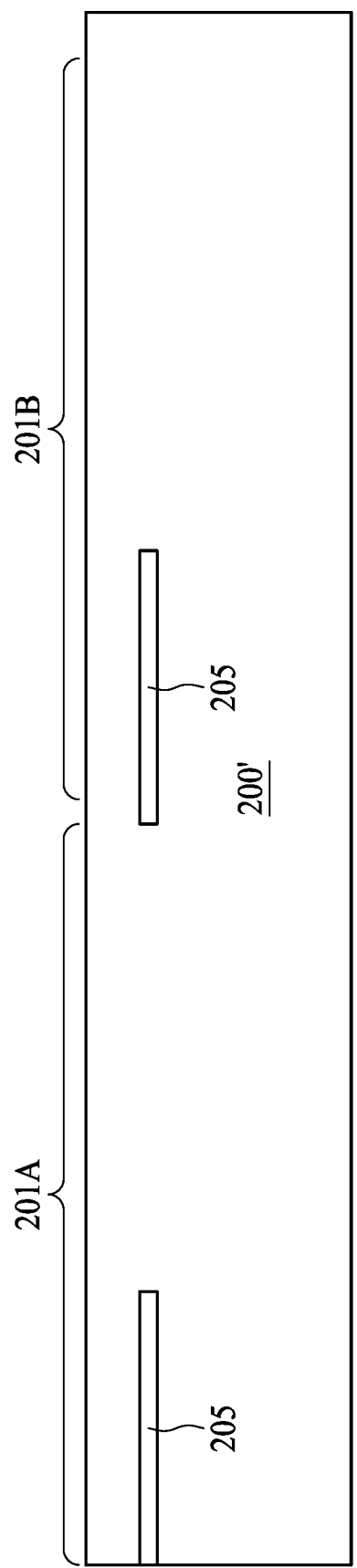
Figure 8B:
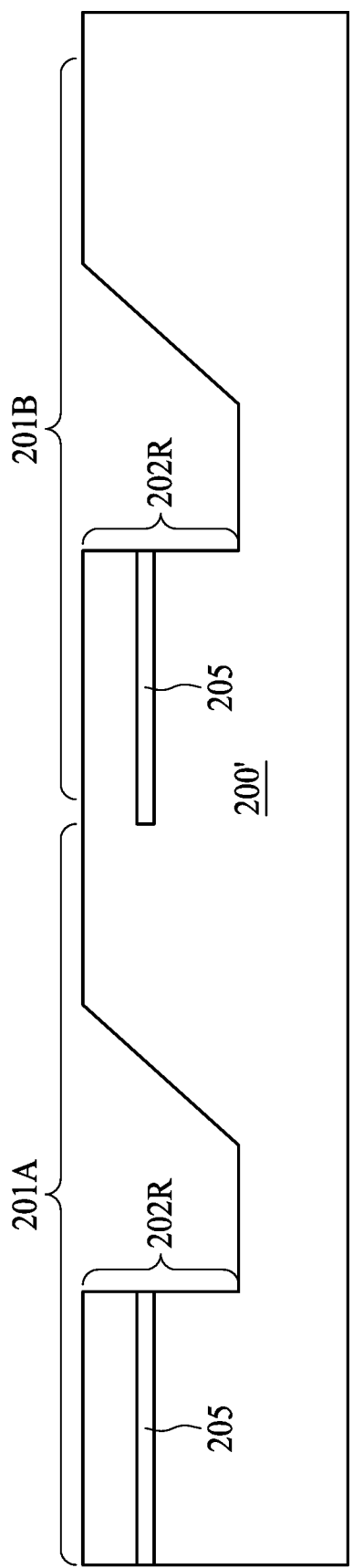

FIG. 8A, FIG. 8B, FIG. 8C, FIG. 8D, FIG. 8E, FIG. 8F, FIG. 8G illustrate cross sectional views of a semiconductor module during various manufacturing operations according to some embodiments of the present disclosure. FIG. 8A to FIG. 8E are wafer-level operations. In FIG. 8A, a semiconductor wafer 200' is provided with a plurality of chip areas, for example, 201A and 201B are two adjacent chip areas. Each of the chip areas 201A and 201B may include one or more waveguide 205. In some embodiments, the waveguide 205 can be embedded under the semiconductor wafer 200'. In some embodiments, the waveguide 205 can be formed on a top surface of the semiconductor wafer 200'. In FIG. 8B, a recess 202R is formed in each of the chip areas 201A and 201B by a wafer-level operation. In some embodiments, the recess 202R may be formed by silicon etching techniques such that particular etching angle, for example, 54.7, can be observed in some of the embodiments. The etching profile of the recess 202R may not be limited to a slanted surface with a particular etching angle, a horizontal profile can also be formed during the etching operation by a suitable lithography operations. Integrating the horizontal profile and the slanted profile is to accommodate sufficient optical path length in order to expand the light beam to a desired level. However, other recess profiles shown in previously described FIG. 7A to FIG. 7D can also be formed by suitable etching operations.

Figure 8C:
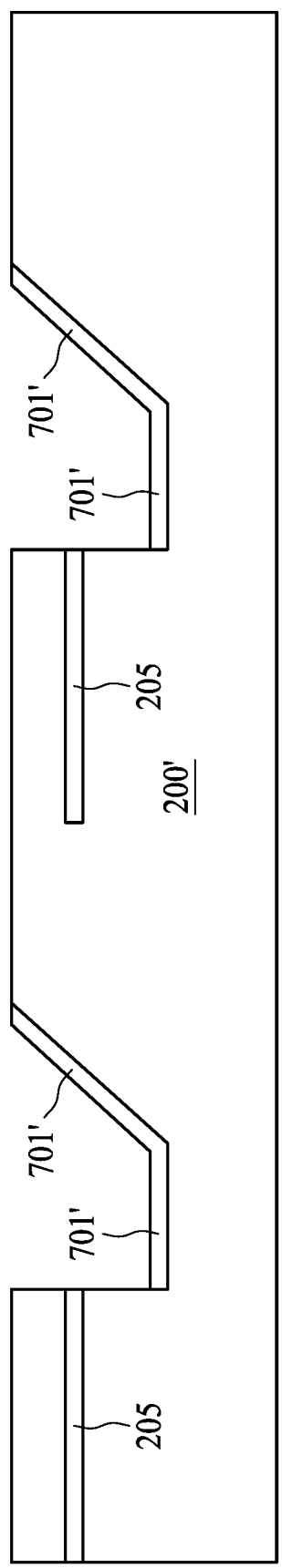
Figure 8D:
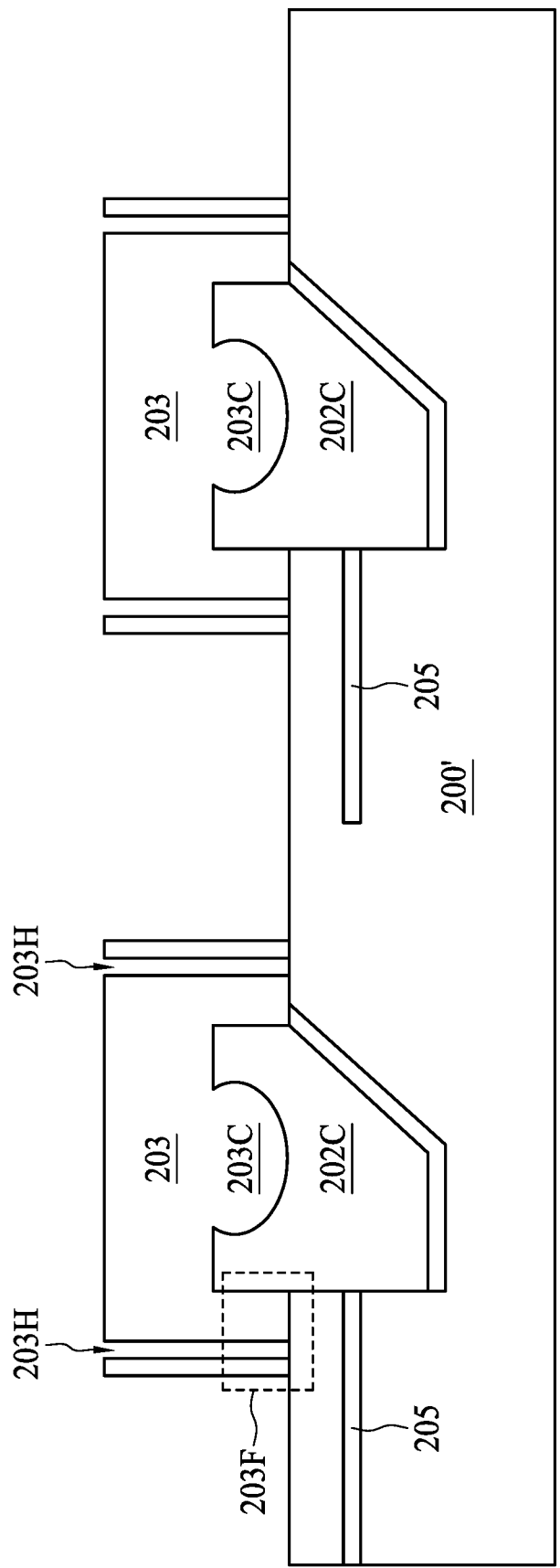

In FIG. 8C, reflective materials 701' can be coated on the bottom of the recess 202R, including a slanted surface and a horizontal surface shown in FIG. 8C, as well as a curved surface shown in FIG. 7B of the present disclosure. Deposition of the reflective materials 701' may include a dielectric deposition with a protection layer covering areas that are not designated to form the dielectric material. The dielectric may include low refractive index materials or materials possess desired light beam reflecting property. In FIG. 8D, a receptacle 203 having one or more holes 203H may be bonded to the semiconductor wafer 200' through a bonding operation. An aligning operation is conducted by speculating an alignment mark on the surface of the semiconductor wafer 200' through the one or more holes 203H on each of the receptacle 203. The alignment operation in the present disclosure may omit turning on of the light source and can be referred to a passive alignment. During the bonding operation, an adhesive or a metal layer can be applied between a bottom of the flange 203F of the receptacle 203 and the top surface of the semiconductor wafer 200'. The adhesive may include UV adhesive or thermal adhesive. After bonding the receptacle 203 to the semiconductor wafer 200', a cavity 202C can be jointly defined by the receptacle 203 and the recess 202R. The waveguide 205 is laterally exposing to the cavity 202C.

In FIG. 8E, a wafer-level testing operation is conducted prior to the singulation of the plurality of the chip areas on the semiconductor wafer 200'. The wafer-level testing operation may include an optical/optical test, an optical/electrical test, or an electrical/optical test. Additional optical elements such as optical fiber may be temporarily coupled to the receptacle 203 during wafer-level testing operation. The testing result allows one to select know-good-package (KGP) to proceed with subsequent packaging operations.

The wafer level product as shown in FIG. 8E can be a final product for commercialization according to market demands.

Figure 8F:
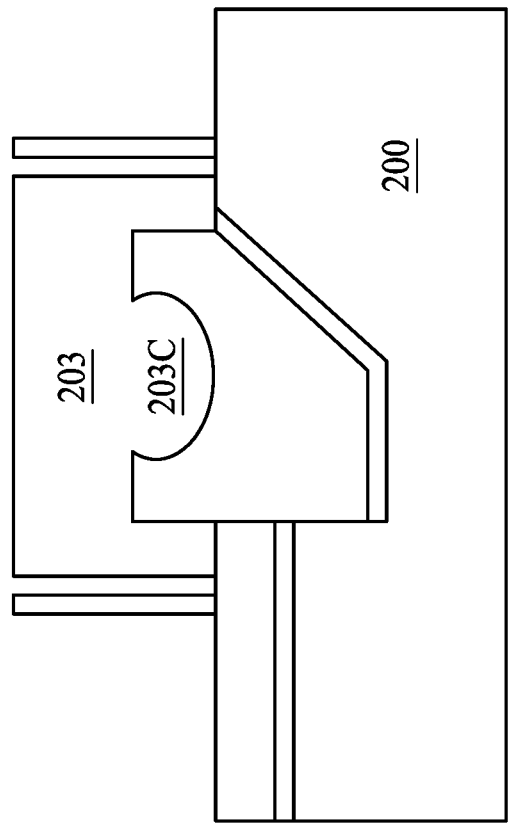
Figure 8F:
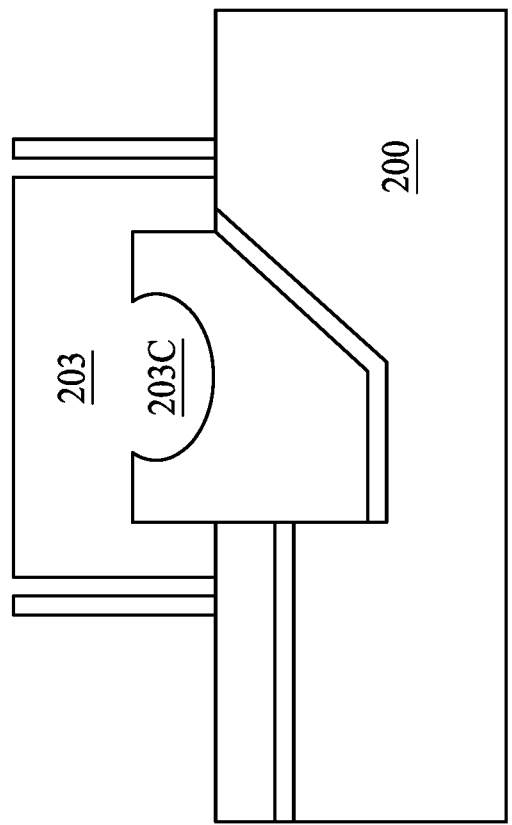
Figure 8G:
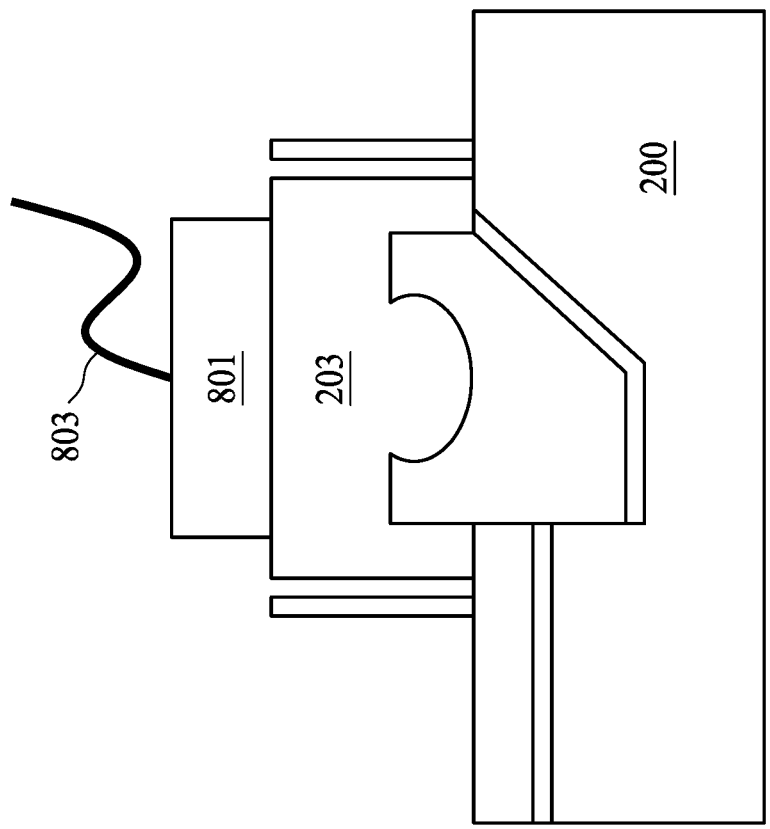
Figure 8G:
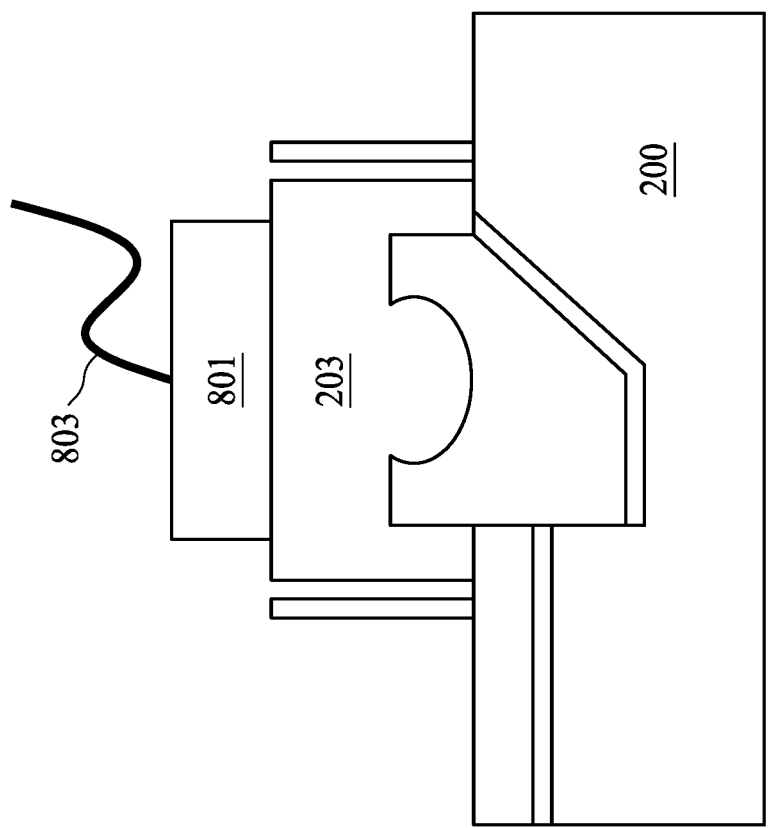

In FIG. 8F, the semiconductor wafer 200' is singulated through boundaries between chip areas and a plurality of semiconductor chips are then obtained as shown in FIG. 8F. The KGPs are selected to proceed with integrating with a pluggable ferrule 801 carrying one or more optical fibers 803. Note the receptacle 203 includes a receivable means that is designed to be a geometric counterpart of the pluggable ferrule 801. By using the geometric limitations on the receptacle 203 and the ferrule 801, the alignment of the fiber with previously described optical path can be completed with simple plug-in assembly without further active alignment, that is, turning on a light source in order to fine tune the light coupling efficiency by moving the optical components.

Figure 9A:
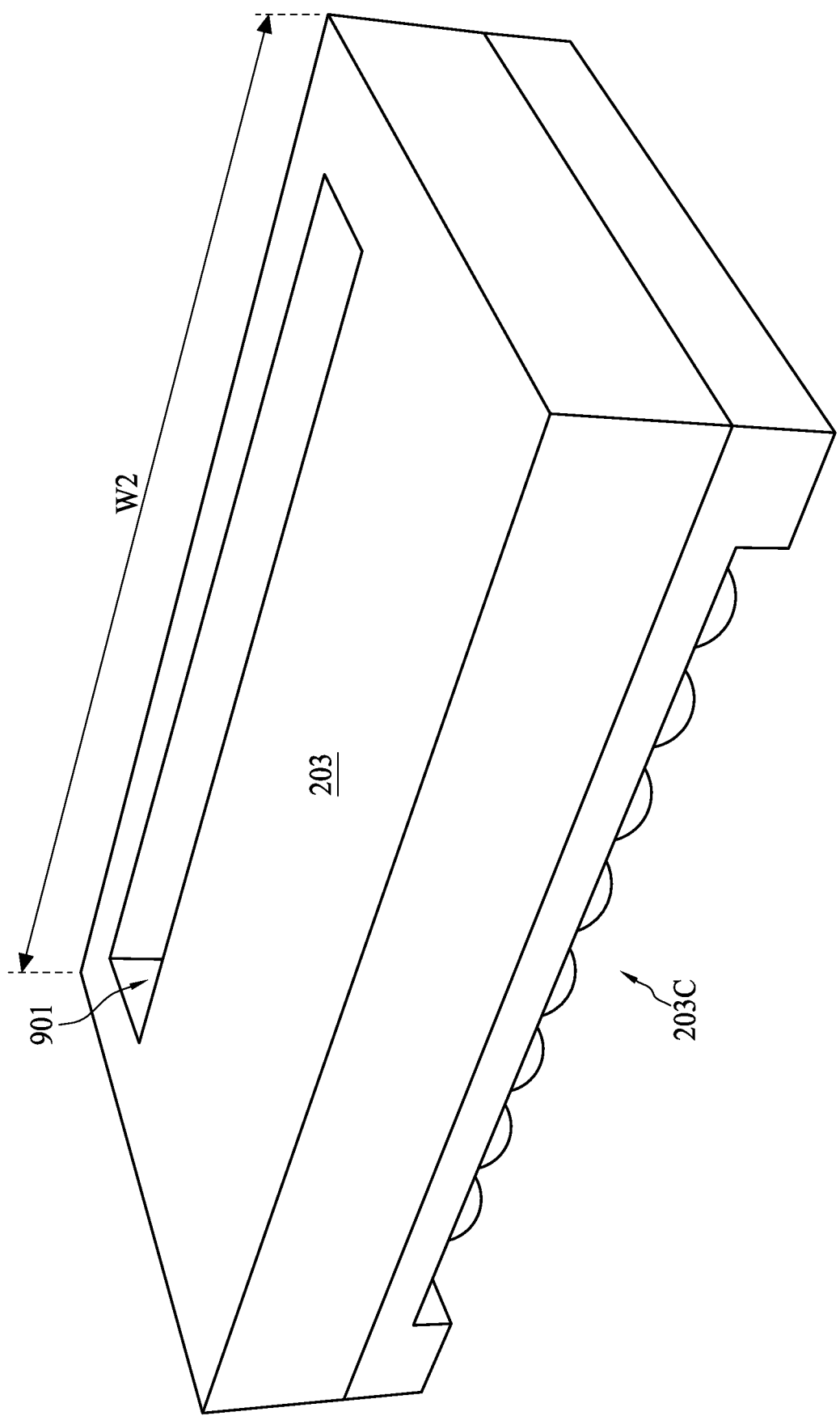
FIG. 9A and FIG. 9B illustrate perspective views of a receptacle with a micro lens array and a ferrule with a fiber array according to some embodiments of the present disclosure.
Figure 9B:
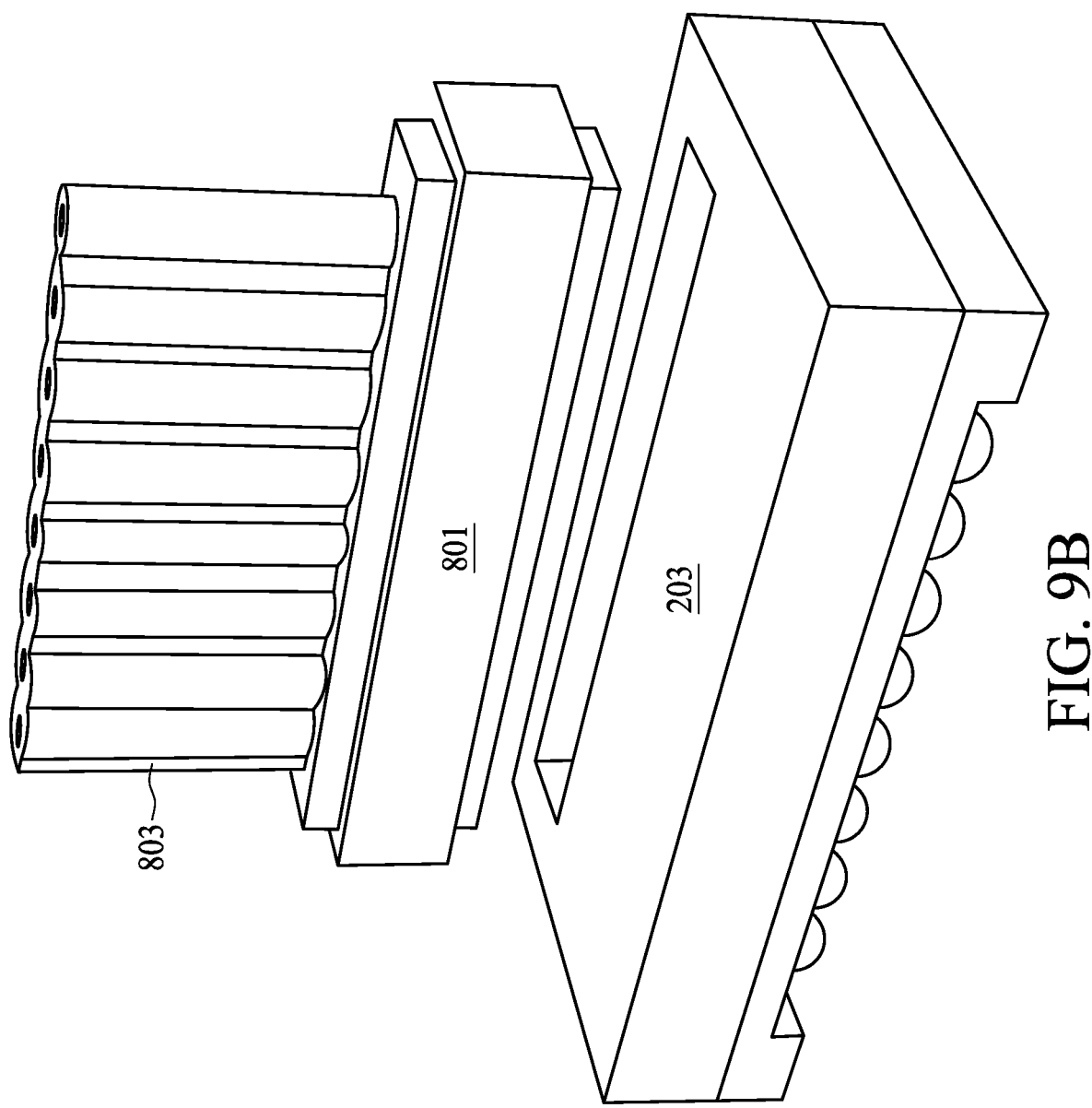

FIG. 9A and FIG. 9B illustrate perspective views of a receptacle 203 with a micro lens array and a ferrule 801 with a fiber array 803 according to some embodiments of the present disclosure. In FIG. 9A, as previously discussed, the collimator 203C on the receptacle 203 can be a ball lens or a micro lens array. When the receptacle 203 having a second width W2 receiving a plurality of waveguides, the collimator 203C may include a micro lens array. The receivable means 901 on the receptacle 203 may accordingly possess an elongated shape across the direction of the second width W2. In FIG. 9B, the pluggable ferrule 801 may match the shape of the receivable means 901 on the receptacle 203. The receivable means 901 is designed to be a geometric counterpart of the pluggable ferrule 801. By using the geometric limitations on the receptacle 203 and the ferrule 801, the alignment of the fiber array with previously described optical path can be completed with simple plug-in assembly without further active alignment, that is, turning on a light source in order to fine tune the light coupling efficiency by moving the optical components.

Figure 10A:
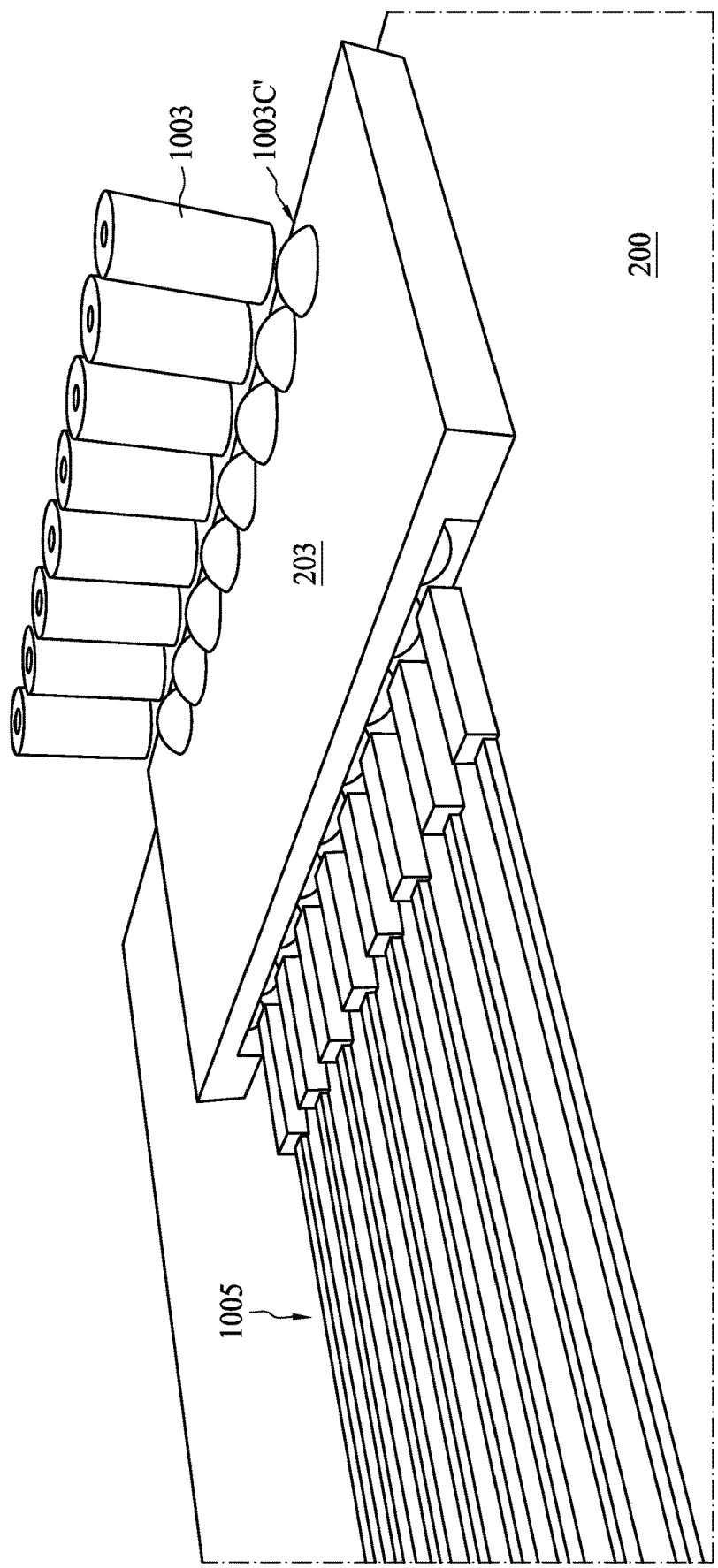
FIG. 10A illustrates s perspective view of a receptacle with a micro lens array, a ferrule with a fiber array, and the underlying chip area according to some embodiments of the present disclosure.

Referring to FIG. 10A, FIG. 10A illustrates s perspective view of a receptacle 203 with a micro lens array 1003C', a fiber array 1003, and the underlying semiconductor substrate 200 according to some embodiments of the present disclosure. In FIG. 10A, a waveguide array 1005 is positioned on the semiconductor substrate 200. Optical signals carried by the waveguide array 105 enters the cavity jointly formed by the receptacle 203 and a recess (not shown) of the semiconductor substrate 200. A first collimator under the receptacle 203 reduces expanded light beams to a beams, the parallel beams then being reflected by a reflector (not shown) and enters the second collimator 1003C' over the receptacle 203. An optical fiber array 1003 may be positioned over the second collimator 1003C' and receiving the beams exiting from the second collimator 1003C'. In some embodiments, the optical fiber array 1003 can be easily aligned with the second collimator 1003C' by having a ferrule geometrically matching a receivable means of the receptacle 203, as previously described in FIG. 9B.

Figure 10B:
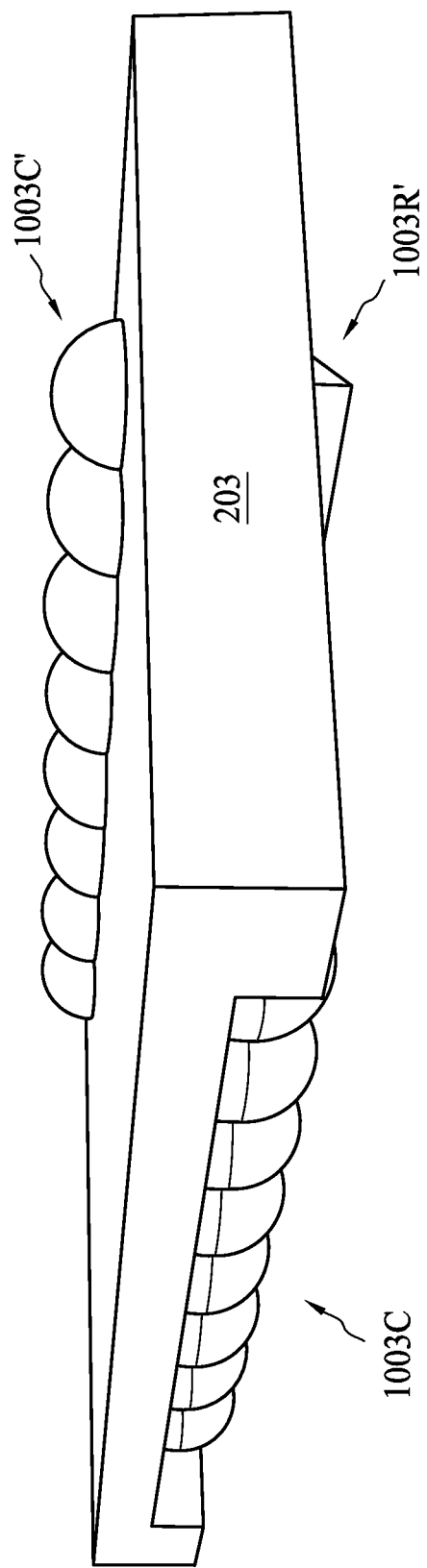
Figure 10D:
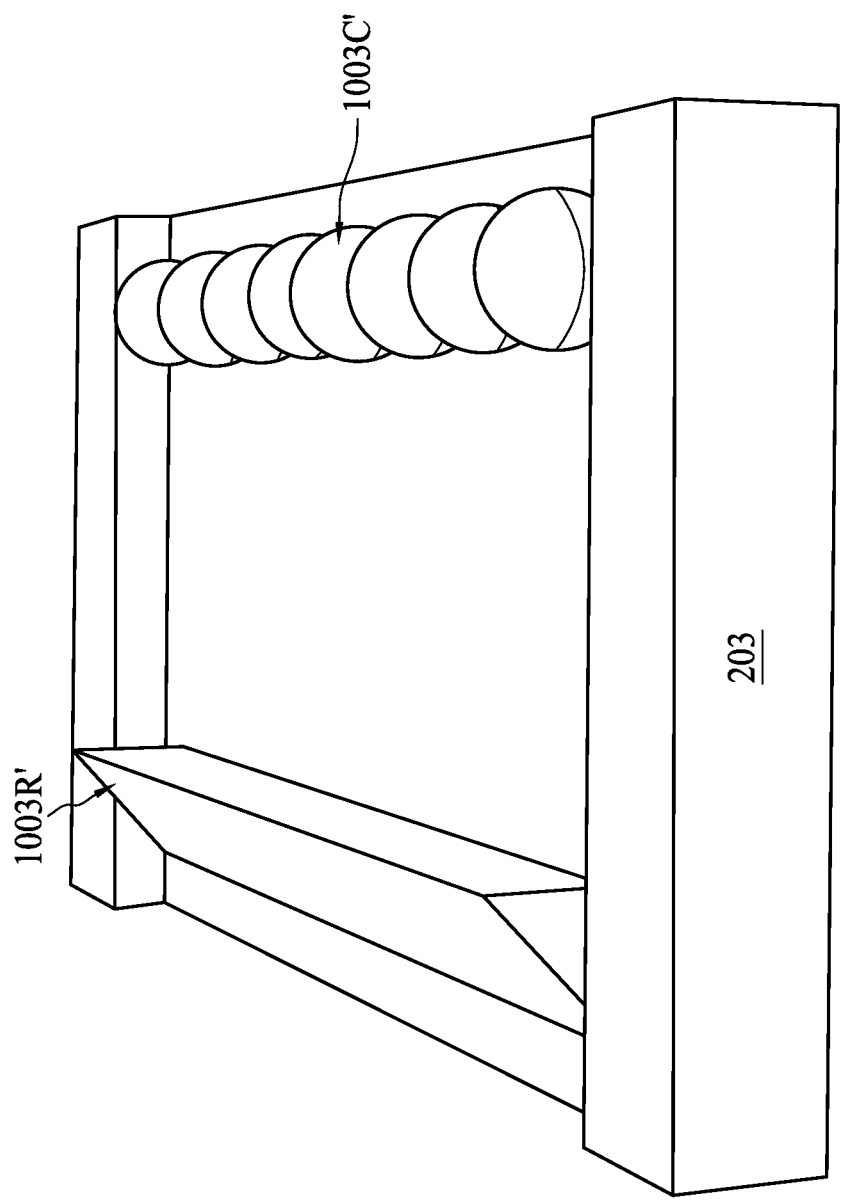

FIG. 10B, FIG. 10C, and FIG. 10D illustrate various perspective views of a receptacle 203 with a micro lens array 1003C' according to some embodiments of the present disclosure. FIG. 10B shows a side view of the receptacle 203. The first collimator 1003C and the second collimator 1003C' can be viewed to both be micro lens arrays. In some embodiments, the number of the micro lens at the position of the first collimator 1003C is substantially identical to the number of the micro lens at the position of the second collimator 1003C'. In some embodiments, the second collimator 1003C' can be devised in the ferrule instead of the receptacle 203. FIG. 10C shows a top view of the receptacle 203. The micro lens array at the position of the second collimator 1003C' can be viewed in FIG. 10C. FIG. 10D shows a bottom view of the receptacle 203. The micro lens array at the position of the first collimator 1003C and the reflector 1003R' can be viewed in FIG. 10D.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. The term "substantially coplanar" can refer to two surfaces within micrometers of lying along a same plane, such as within 40 µm, within 30 µm, within 20 µm, within 10 µm, or within 1 µm of lying along the same plane.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A wafer-level semiconductor package structure, comprising:
    a semiconductor wafer having a plurality of chip areas, at least one of the chip areas comprising:
        a recess in the semiconductor wafer and having a first width;
    a receptacle bonded to a top surface of the semiconductor wafer and aligning with the recess, the receptacle and the recess jointly forming a cavity, and the receptacle having a second width, wherein the receptacle comprises a first collimator, a second collimator, and a reflector, and the first collimator is disposed at a bottom surface of the receptacle and the second collimator is disposed a top surface of the receptacle; and
    a waveguide having an end exposed to the cavity, wherein the waveguide, the first collimator and the reflector are aligned to cause an optical path redirected by reflection from a horizontal direction to a vertical direction, the vertical direction extending between the top surface and the bottom surface, and, wherein the second width is greater than the first width.

2. The wafer-level semiconductor package structure of claim 1, wherein adjacent chip areas are separated by a singulation region.

3. The wafer-level semiconductor package structure of claim 1, wherein the first collimator comprises a micro lens or a micro lens array.

4. The wafer-level semiconductor package structure of claim 1, wherein the reflector comprises a prism or a prism array.

5. The wafer-level semiconductor package structure of claim 1, wherein the recess comprises a curved surface or a slanted surface.

6. The wafer-level semiconductor package structure of claim 5, wherein the recess comprises a reflecting layer on the curved surface or the slanted surface.

7. The wafer-level semiconductor package structure of claim 1, wherein the receptacle comprises a hole configured to align with a mark in one of the chip areas of the semiconductor wafer.

8. The wafer-level semiconductor package structure of claim 1, wherein the first collimator is vertically offset relative to the second collimator.

9. The wafer-level semiconductor package structure of claim 1, wherein the second collimator and the reflector are vertically aligned.

10. The wafer-level semiconductor package structure of claim 1, wherein the receptacle comprises a flange in connection with the semiconductor wafer, and the flange of the receptacle and the recess jointly form a cavity.

11. The wafer-level semiconductor package structure of claim 10, wherein the first collimator is surrounded by the flange.

12. The wafer-level semiconductor package structure of claim 10, wherein the reflector is surrounded by the flange.

13. A semiconductor module, comprising:
    a photonic integrated circuit, comprising
        a substrate;
        a waveguide disposed on the substrate; and
        a recess in the substrate and having a first width;
    a receptacle bonded to a top surface of the substrate and aligning with the recess, the receptacle and the recess jointly forming a cavity, and the receptacle having a second width, wherein the second width is greater than the first width, and wherein the receptacle comprises a first collimator, a second collimator and a reflector, and the first collimator is disposed at a bottom surface of the receptacle and the second collimator is disposed a top surface of the receptacle,
    wherein the waveguide, the first collimator and the reflector are aligned to cause an optical path redirected by reflection from a horizontal direction to a vertical direction, the vertical direction extending between the top surface and the bottom surface.

14. The semiconductor module of claim 13, wherein the waveguide is exposed to the cavity.

15. The semiconductor module of claim 13, wherein the recess comprises a curved surface or a slanted surface.

16. The semiconductor module of claim 13, wherein the receptacle comprises a hole configured to align with a mark on the top surface of the substrate.

17. A method for manufacturing a semiconductor module, comprising:
    providing a semiconductor wafer having a plurality of chip areas, at least one of the chip areas having a waveguide;
    forming a recess in the semiconductor wafer; and
    bonding a receptacle to the semiconductor wafer and overlying the recess, the receptacle and the recess jointly forming a cavity, and the waveguide exposing to the cavity, wherein the receptacle comprises a first collimator, a second collimator and a reflector, and the first collimator is disposed at a bottom surface of the receptacle and the second collimator is disposed a top surface of the receptacle, and wherein the waveguide, the first collimator and the reflector are aligned to cause an optical path redirected by reflection from a horizontal direction to a vertical direction, the vertical direction extending between the top surface and the bottom surface.

18. The method of claim 17, wherein bonding the receptacle comprises aligning the receptacle to an alignment mark on the top surface of the semiconductor wafer through a hole of the receptacle.

19. The method of claim 17, further comprising:
    performing a wafer-level testing after bonding the receptacle; and
    singulating the semiconductor wafer into a plurality of chips after the wafer-level testing.

20. The method of claim 17, wherein the second collimator and the reflector are vertically aligned.

* * * * *